United States Patent [19]

Buma et al.

[11] Patent Number: 4,744,589
[45] Date of Patent: May 17, 1988

[54] SUSPENSION CONTROL SYSTEM

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Toyota, Japan

[21] Appl. No.: 913,262

[22] Filed: Sep. 30, 1986

[30] Foreign Application Priority Data

Oct. 1, 1985 [JP] Japan ............................. 60-219686
Oct. 2, 1985 [JP] Japan ............................. 60-221659

[51] Int. Cl.$^4$ .................................................. B60G 17/00
[52] U.S. Cl. ..................................... 280/707; 280/689
[58] Field of Search ............... 280/6 R, 6.1, 611, 707, 280/689, 772; 180/41; 364/424

[56] References Cited

U.S. PATENT DOCUMENTS

| | | | |
|---|---|---|---|
| 4,468,739 | 8/1984 | Woods et al. | 280/707 |
| 4,589,676 | 5/1986 | Meloche et al. | 280/707 |
| 4,616,846 | 10/1986 | Furuya et al. | 280/707 |

FOREIGN PATENT DOCUMENTS 2844028 4/1980 Fed. Rep. of Germany .
57-172808 4/1981 Japan .

Primary Examiner—John J. Love
Assistant Examiner—Ross Weaver
Attorney, Agent, or Firm—Oblon, Fisher, Spivak, McClelland & Maier

[57] ABSTRACT

A suspension control system which provides a vehicle height signal representative of a vehicle height, a vehicle height data signal responsive to said vehicle height signal, and a first determination signal representative of a suspension characteristic alteration if a difference between a maximum and minimum value of said vehicle height data signal within a predetermined suspension characteristic alteration determination time interval exceeds a first value thereof, and which alters said suspension characteristic in response to said first determination signal. A suspension system which has a similar operation as said suspension system except that it provides a second determination signal representative of suspension characteristic restoration instead of a first determination signal if a difference between a maximum and minimum value of said vehicle height data signal within a first time interval of restoring determination is less than a second reference value thereof for a predetermined number of consecutive times, and which alters vehicle height.

19 Claims, 38 Drawing Sheets

FIG.10

| VEHICLE SPEED | | 25 | | 40 | 70 | 90 | 100 | |
|---|---|---|---|---|---|---|---|---|
| ROUGH ROAD | SOFT | | SOFT / SPORT | | SPORT | SPORT | SPORT | HARD |
| SMOOTH ROAD | SOFT | | SOFT | | SOFT | SOFT / SPORT | SPORT | SPORT |

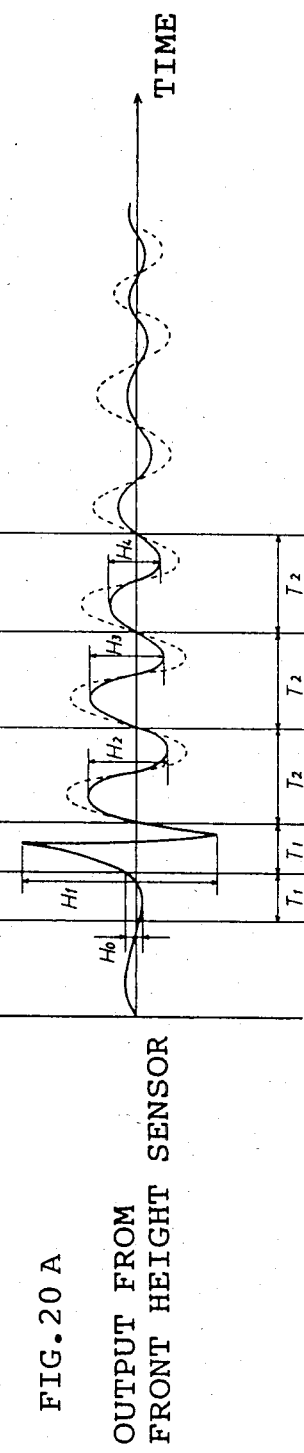
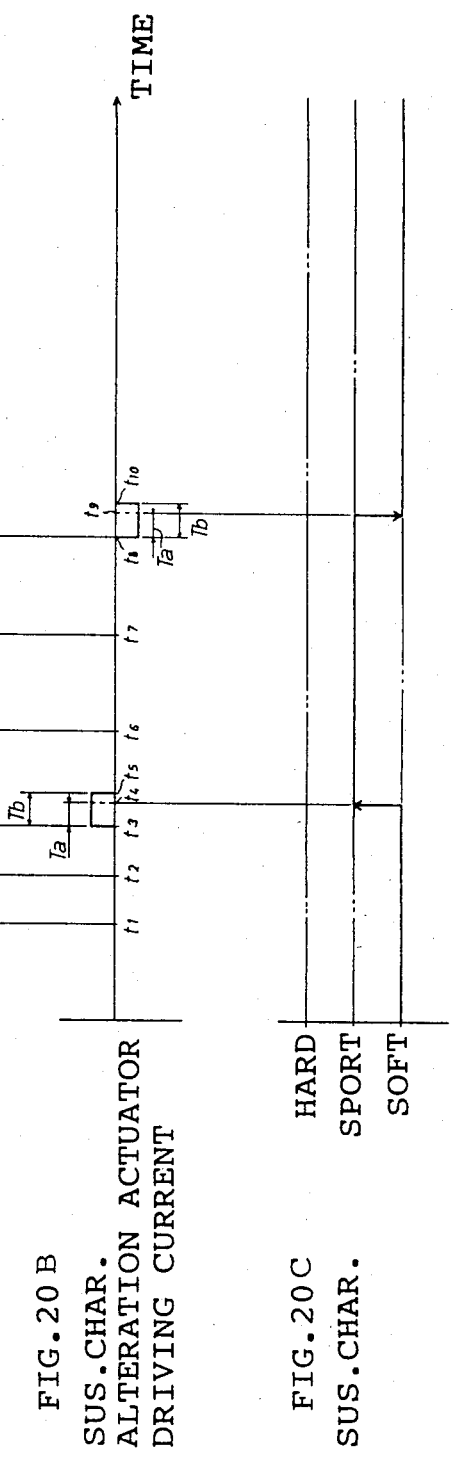
FIG.20 A  OUTPUT FROM FRONT HEIGHT SENSOR
FIG.20 B  SUS.CHAR. ALTERATION ACTUATOR DRIVING CURRENT
FIG.20 C  SUS.CHAR.

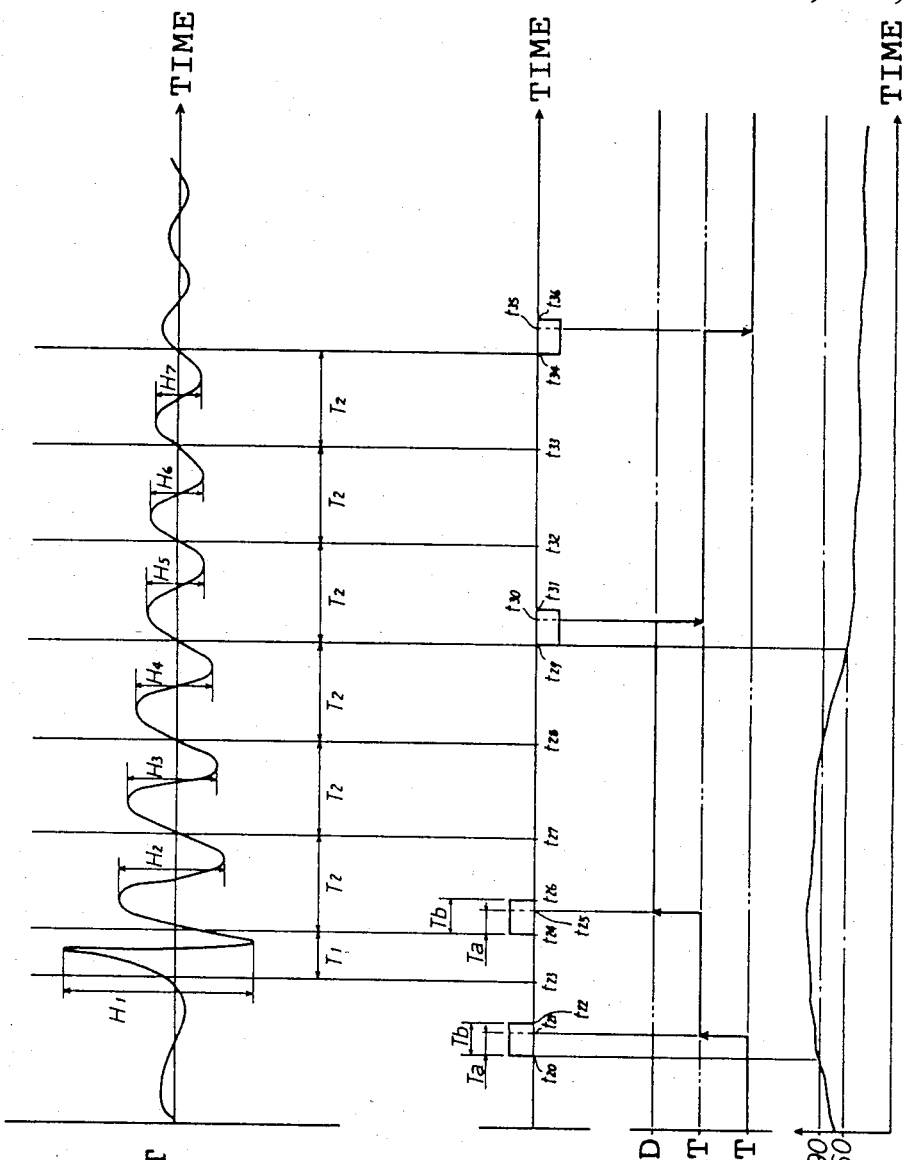

FIG. 23

| VEHICLE SPEED V [km/h] | | | 40 | 90 | |
|---|---|---|---|---|---|
| ROUGH ROAD | HIGH MODE | HIGH | | HIGH | NORMAL |
| | NORMAL MODE | NORMAL | | HIGH | |
| SMOOTH ROAD | HIGH MODE | HIGH | | HIGH | LOW |
| | NORMAL MODE | NORMAL | | NORMAL | |

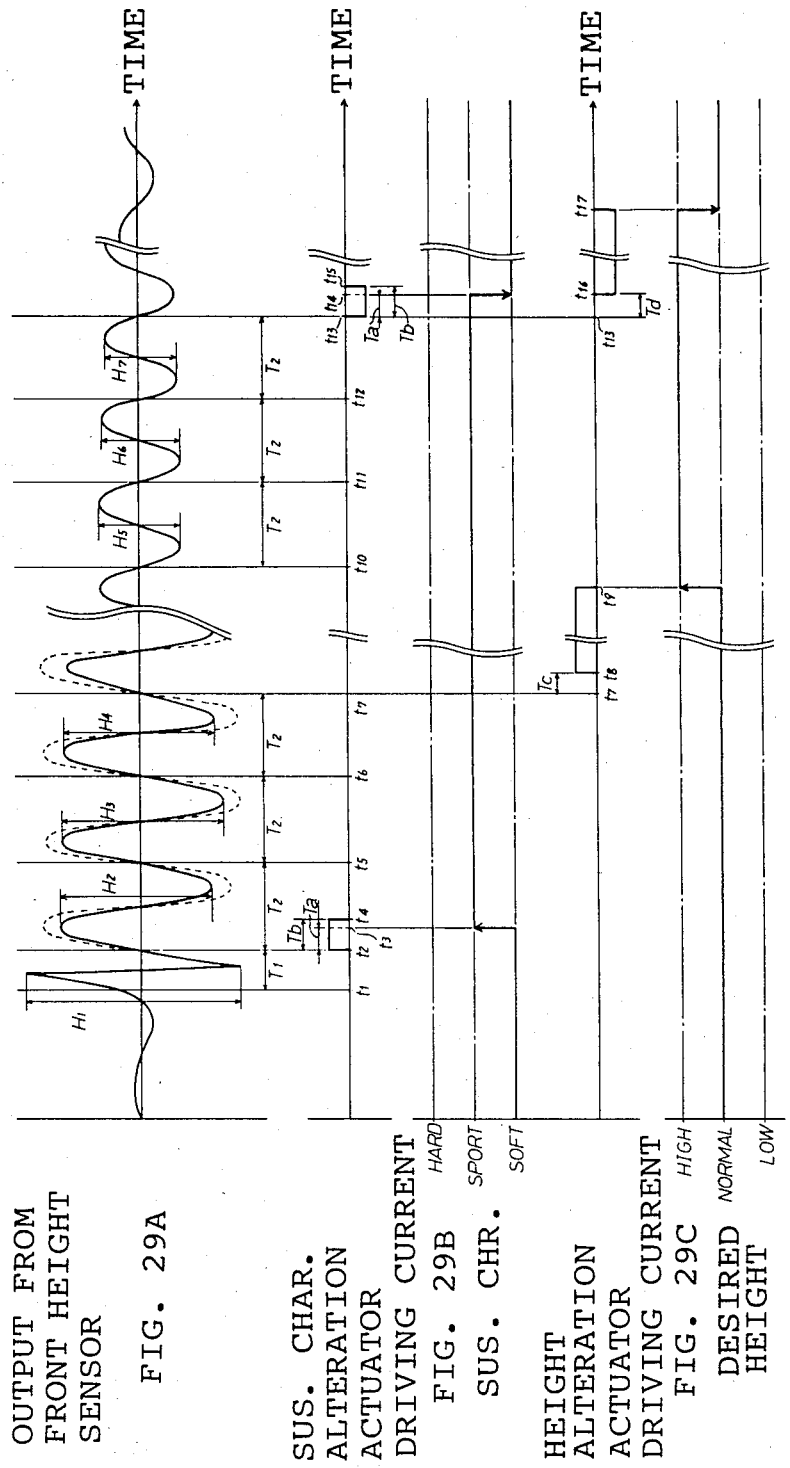

SUSPENSION CONTROL SYSTEM

BACKGROUND OF THE INVENTION

1. Field of the Invention

The present invention relates to a suspension control system, especially to a suspension control system which alters a suspension characteristic suitably for conditions of the road on which the vehicle is running.

2. Description of the Related Art

A suspension control system has been proposed which includes a vehicle height sensor for detecting the changes in the distance between a vehicle axle and a vehicle body and which damps the vibration exerted on the vehicle body, in the case of rough road running, by altering the suspension characteristic as well as vehicle height in order to get improve ride comfort, control, and stability. An example of the above invention is Published Unexamined Japanese Patent Application No. 57-172808 entitled "Vehicle Height Adjusting Apparatus". It prevents bottoming of the vehicle due to its bounding by raising the vehicle height higher than a predetermined value, when a smooth road running changes into a rough road one.

However, the suspension control system according to the prior art possesses the following problems.

A problem is the slowness in determining a continuous rough road, since it has been executed by counting the frequency at which an actual vehicle height is different from an average vehicle height by a predetermined value or more within a predetermined time interval. Inconvenience is thus quite probable that the vehicle has already moved out of the rough road onto a smooth road, and the reliability of detecting a rough road is lowered.

Another problem is, relating to the above-mentioned slow determination of the rough road, the inability to quickly damp cyclical vibrations such as pitching or bouncing which follows the rough road running by altering the suspension characteristic. Therefore, the suspension control system according to the prior art, allowing the vibration to continue and the vehicle position to change, has the disadvantages such as reduced control and stability as well as discomfort for the passengers.

A further problem is the reduced durability and reliability due to an unnecessarily frequent suspension characteristic alteration. Once the suspension characteristic is altered, the vibrating condition of the vehicle changes even if the vehicle runs on the road of the same conditions as it has. However, the condition for determining the continuous rough road is not corrected in response thereto, thus the hunting of the control for altering the suspension characteristic is caused.

Further more, the suspension control system according to the above-mentioned prior art determines the rough road running when a vehicle height change value gets greater than a reference value more often than a predetermined frequency, thus causing the following problems.

A problem is the reduced durability and reliability of a vehicle height adjustment means. A vehicle height, for example, is altered frequently even in response to a sporadic bump or dip on the road surface, unless the condition for raising the vehicle height is set adequately.

Another problem is the reduced control and stability, with the vehicle body rolling, during high speed. This is because the center of balance of the vehicle gets higher since the vehicle height is raised frequently.

A further problem is the difficulty both in detecting correctly the condition of rough road running and in adjusting the vehicle height, when the condition for those operation is the same as that for altering the suspension characteristic.

SUMMARY OF THE INVENTION

One object of the present invention is to detect reliably the vibration exerted on the vehicle body which follows the continuous rough road running and the vibration with a certain cycle.

Another object is to damp the above-mentioned vibrations by altering quickly the suspension characteristic.

A third object is to realize the suitable suspension control for both of the road surface and the vehicle position.

A fourth object is to improve ride comfort, as well as to deep good control and stability.

A fifth object is to have a different condition for starting the suspension control from that for terminating, thereby preventing the hunting subsequent to the control.

A sixth object is to make the frequency of the suspension characteristic alteration minimum, thus improving durability and reliability of apparatus such as actuators operative to alter the suspension characteristic.

A seventh object is to enable the semi-active control which alters the suspension characteristic in response to the road surface condition.

A eighth object is to offer more choices in designing the suspension control system, without the restriction concerning the suspension characteristic such as the sacrifice of either ride comfort or control and stability for each other.

A ninth object is to alter the suspension characteristic in response to the quick detection of the vibration of a large amplitude and of high frequency, which generates when the smooth road surface condition turns rough.

A tenth object is to prevent so-called bottoming, rebounded stopper bumping, or the like, all of which are caused by the above-mentioned vibration.

A eleventh object is to improve road holding, other than control, stability, and ride comfort.

A twelfth object is to damp quickly the vibration exerted on the vehicle body.

A thirteenth object is to alter the suspension characteristic in response to the vibration exerted on the vehicle body by the sporadic bump or dip on the road surface, thereby damping such vibration.

A fourteenth object is to alter the vehicle height additionally in respone to the continuous rough road.

A fifteenth object is to prevent the hunting which follows the vehicle height alteration.

A sixteenth object is to make the frequency of the vehicle height alteration minimum, thereby improving reliability and durability of the apparatus which alter the vehicle height.

A seventeenth object is to enable the control for altering the vehicle height in response to the reliable detection of the continuous rough road.

A eighteenth object is to enable the semi-active control which alters both the suspension characteristic and the vehicle height in response to the road road surface condition.

The suspension control system according to the present invention having a principle as shown in FIG. 1, includes;

a vehicle height detection means M1 for providing a vehicle height signal representative of a vehicle height;

a determination means M2 having a suspension characteristic alteration determination means M4 for providing a vehicle height data signal responsive to the vehicle height signal and for providing a first determination signal representative of a suspension characteristic alteration if the difference between a maximum and minimum value of the vehicle height data signal within a predetermined suspension characteristic alteration determination time interval, and a suspension characteristic restoring determination means M5 for providing a second determination signal representative of suspension characteristic restoration if a difference between a maximum and minimum value of said vehicle height data signal within a first time interval of restoring determination is less than a second reference value thereof a predetermined number of consecutive times; and a suspension characteristic alteration means M3 responsive to the alteration determination means M4 for altering the suspension characteristic.

The vehicle height detection means M1 detects the distance between the body and a wheel axle as the vehicle height. It may adopt the structure in which a potentiometer detects the displacement of the suspension arm relative to the vehicle body and outputs it as an analog signal. Another possible vehicle height detection means detects the displacement as a rotation angle of a slitted disk and detects the amount of light passing through the slit and outputs a digital signal. The vehicle height gives the vehicle height data such as the displacement from a target vehicle height, speed of the height change, the acceleration rate of the height change, and the amplitude of the vibration of the vehicle height. Each represents, respectively, the difference between a predetermined target vehicle height and an actual one, a height change within a predetermined time interval, the change in the speed of the height change, the difference between the maximum and the minimum value of the vehicle height change detected within a predetermined time interval.

The suspension characteristic alteration means M3 alters the suspension characteristic. For example, it is an available structure in which the suspension characteristic alteration means M3 may discreetly and continuously alter the suspension characteristics such as the spring constant of a suspension, the damping force of a shock absorber, the stiffness of a bush, a compliance of a stabilizer; makes the spring constant respectively greater or smaller, by connecting or disconnecting main gas chambers and auxiliary gas chambers of the suspensions to or from each other; increases or decreases the damping force of the shock absorber by changing the diameter of the orifice which adjusts the oil flow of the shock absorber. The suspension characteristic is thus altered to one of three stages, that is, HARD, SOFT, and the intermediate state of the above-mentioned two states, SPORT state.

The alteration determining means M4 determines that the vehicle height data derived from the vehicle height detected by the vehicle height detection means M1 has satisfied the alteration condition, when the difference of the maximum and the minimum value of the vehicle height data within a predetermined time interval is greater than or equal to the predetermined value. It may be structured to determine whether the vehicle height data is applicable to the alteration condition, following the process steps of detecting the vehicle height data every predetermined detection time interval, calculating the difference of the maximum and minimum thereof every predetermined alteration determination time interval, and comparing the calculated value with the first reference value.

The restoring determination means M5 determines that the vehicle height data derived from the vehicle height detected by the vehicle height detection means M1 has satisfied the restoring condition, when the difference of the maximum and the minimum value within the predetermined time interval is less than the second reference value continuously predetermined times. It may be structured to determine whether the vehicle height data is applicable to the restoring condition, by following the steps of detecting the vehicle height data every predetermined detection time interval, calculating the difference of the maximum and minimum thereof every predetermined alteration determination time interval, comparing the calculated value with the second reference value, memorizing the results thereof, and judging whether the calculated value is less than the second reference value for a predetermined number of consecutive times.

The determination means M2, provided with the above-mentioned alteration determination means M4 and with the restoring determination means M5, determines whether the vehicle height data from the vehicle height detection means M1 is applicable to the alteration condition or to the restoring condition. The determination means M2, the alteration determination means M4, the restoring determination means M5 may be realized respectively by a logic circuit of discrete electronic elements. They may also be realized by a logic circuit of integrated chips, including a CPU, a ROM, a RAM and other peripheral circuit elements, in which the vehicle height data is determined to be applicable to either of the above-mentioned two conditions.

Another available suspension control system according to the present invention having a principle similar to the above-mentioned system as shown in FIG. 22, includes;

a vehicle height detection means M1 for providing a vehicle height signal representative of a vehicle height;

a suspension characteristic alteration determination means M2 for providing a vehicle height data signal responsive to the vehicle height signal and for providing a first determination signal representative of a suspension characteristic alteration if a difference between a maximum and and minimum value of said vehicle height data signal within a predetermined suspension characteristic alteration determination time interval exceeds a first value thereof;

a suspension characteristic alteration means M4 responsive to the alteration determination means M3 for altering the suspension characteristic;

a vehicle height alteration determination means M3 for providing a second determination signal representative of a vehicle height alteration if a difference between a maximum and minimum value of the vehicle height data signal within a first time interval of vehicle height altering determination is greater than a second reference value thereof for a predetermined number of consecutive times; and a vehicle height alteration means M5 responsive to determination means M3 for altering the vehicle height.

The vehicle height alteration determination means M3 determines that the vehicle height data derived from the vehicle height detected by the vehicle height detection means M1 has satisfied the vehicle height alteration condition, when after the suspension characteristic alteration condition is determined to be satisfied the difference of the maximum and the minimum value within the predetermined time interval is greater than or equal to the second reference value for a predetermined number of consecutive times. It may be structured to determine whether the vehicle height data is applicable to the vehicle height alteration condition by following the process steps of detecting the vehicle height data every predetermined detection time interval, calculating the difference of the maximum and minimum thereof every predetermined alteration determination time interval, comparing the calculated value with the second reference value, memorizing the results thereof, and judging whether the calculated value is greater than or equal to the second reference value for a predetermined number of consecutive times.

The vehicle height alteration means M5 alters the set vehicle height. However, the height altered thereby is not detected by the above-mentioned vehicle height detection means M1 meant for the change in both vehicle height and the vibration according to the running of the vehicle. The vehicle height alteration means M5, for example in an air suspension provided with an air spring unit, may be structured to set the vehicle height at HIGH position by allowing a compressor to transfer air to the gas chambers of the air spring unit, thereby enlarging the volume thereof, and to set the vehicle height at selectively NORMAL and LOW positions by opening and closing the discharge valves of the unit to discharge the air into the gas chamber, thereby decreasing the volume thereof. In the suspension utilizing oil pressure to absorb shock, it may have the structure of step and stepless adjustment of the vehicle by selectively feeding and discharging oil instead of air as in the above-mentioned case.

Accordingly, the suspension control system structured as above, detecting reliably the vibration exerted on the vehicle body during continuous rough road running or the vibration with a certain cycle, alters or restores the suspension characteristic in order to damp those vibrations, which attains the technological theme of the present invention.

BRIEF DESCRIPTION OF THE DRAWINGS

The above objects and features of the present invention will become more apparent from the description of the invention which follows, taken in conjunction with the accompanying drawings, wherein like reference numerals designate like elements, and wherein:

FIG. 10 is a diagram illustrative of the relationship between the vehicle speed and suspension characteristic.

FIGS. 20A-C are diagram illustrative of the relationship between the time and front height sensor output, drive current of an actuator, suspension characteristic respectively.

FIGS. 21A-D are diagram illustrative of the relationship between the time and front height sensor output, drive current, suspension characteristic vehicle speed respectively.

FIG. 23 is a diagram illustrative of the relationship between the vehicle speed and the vehicle height of the second embodiment.

FIGS. 29A-C are diagram illustrative of the relationship between the time and front height sensor output, drive current of an actuator, suspension characteristic respectively.

DETAILED DESCRIPTION OF THE PREFERRED EMBODIMENT

Preferred embodiments of the present invention are described in detail hereinunder referring to the attached drawings.

Figure 1:
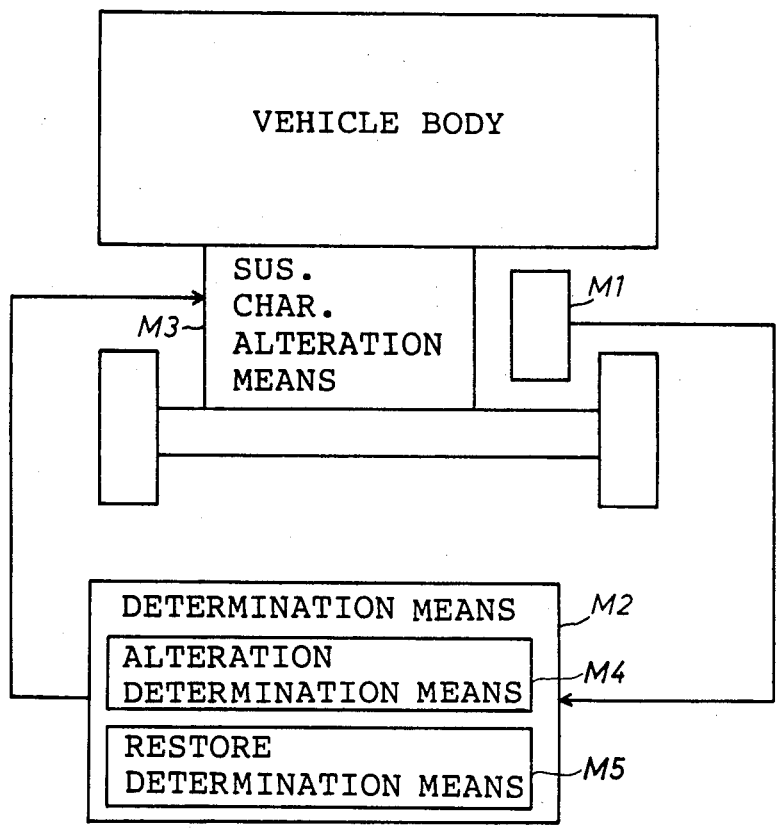
FIG. 1 is a schematic block diagram showing the principle structure of a first embodiment of the present invention.
Figure 2:
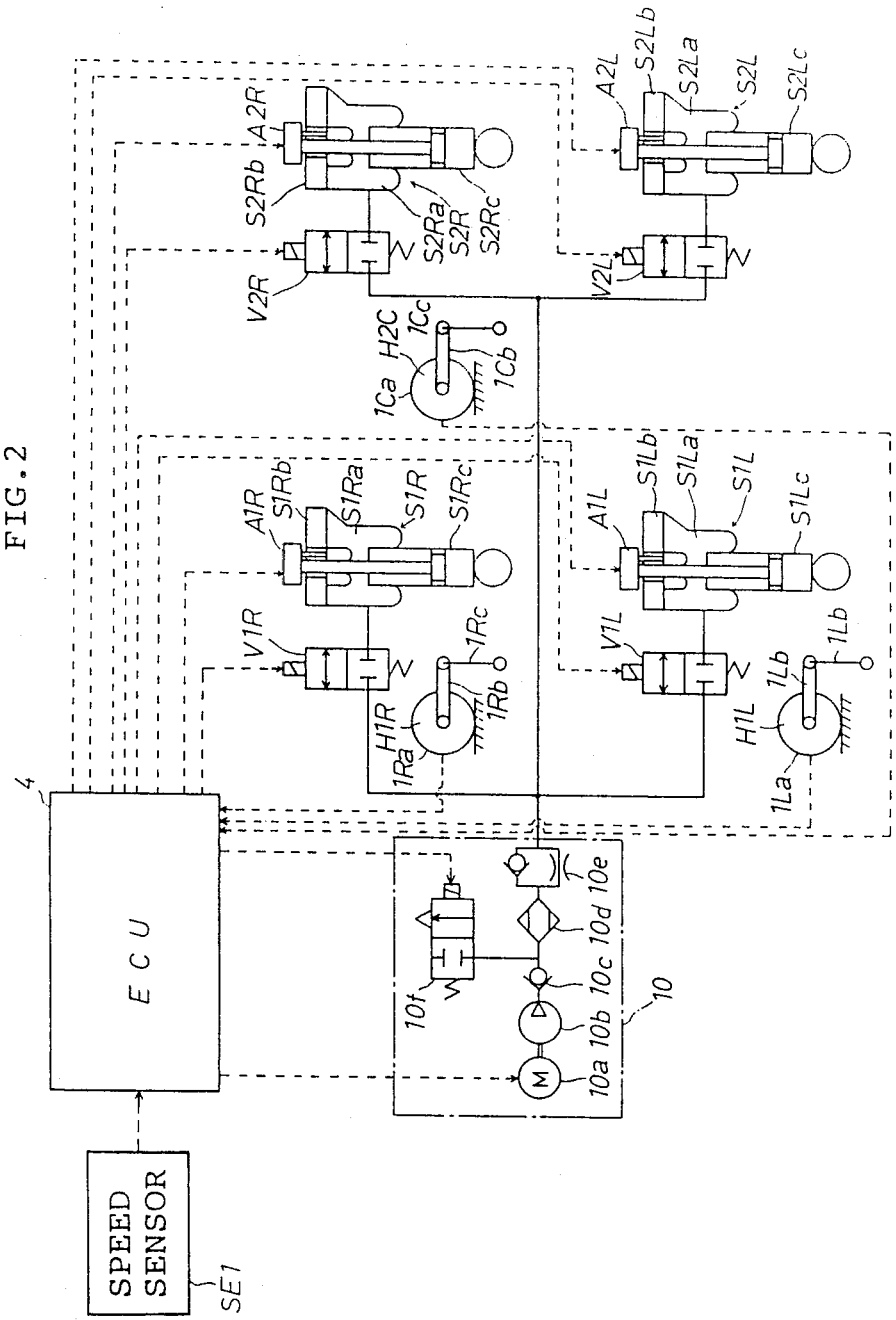
FIG. 2 is a system diagram showing the first embodiment of the present invention.

FIG. 2 shows details of the suspension control system for a vehicle utilizing the suspension according to the first embodiment of the present invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. A rear vehicle height sensor H2C is provided between the vehicle body and a rear wheel to detect the distance between the vehicle body and a rear suspension arm. The short cylindrical bodies 1Ra, 1La and 1Ca of the vehicle height sensors H1R, H1L and H2C are secured on the vehicle body. Links 1Rb, 1Lb and 1Cb extend from the center shafts of the bodies 1Ra, 1La and 1Ca substantially perpendicular to the center shafts. Turnbuckles 1Rc, 1Lc and 1Cc are rotatably coupled to one end of the links 1Rb, 1Lb and 1Cb opposite the bodies 1Ra, 1La and 1Ca respectively. The other end of the turnbuckles 1Rc, 1Lc and 1Cc opposite the links are rotatably coupled to a portion of the suspension arms.

A plurality of light interrupters can be provided with the vehicle height sensors H1R, H1L and H2C respectively for detecting the vehicle height change as 4-bit vehicle height data by operating a disc so as to switch ON and OFF the light interrupters in response to changes in the vehicle height, thus outputting digital signal. The above-mentioned disc is substantially provided coaxial with a center shaft of the vehicle height sensor and defines a slit thereon.

Set forth below is an explanation of the air suspensions S1R, S1L, S2R and S2L. The air suspension S2L is provided between the left rear suspension arm and the vehicle body in parallel with a suspension spring (not shown). The air suspension S2L is composed of a main gas chamber S2La functioning as an air spring, an auxiliary gas chamber S2Lb, a shock absorber S2Lc, and an actuator A2L for altering the spring constant and the damping force of the shock absorber. The air suspensions S1R, S1L and S2R have the similar components and functions to the above-mentioned air suspension S2L, and are provided for the right front wheel, the left front wheel, and the right rear wheel, respectively.

A compressed air feed and discharge system 10 for an air spring of the air suspensions S1R, S1L, S2R and S2L operates a motor 10a to drive a compressor 10b for generating the compressed air. The compressed air is led to an air drier 10d via a check valve 10c, where the compressed air moves from the compressor 10b side to the air drier 10d side. The air drier 10d functions to dry compressed air supplied for the air suspensions S1R, S1L, S2R and S2L and to protect every part of the air suspensions S1R, S1L, S2R and S2L from moisture, as well as preventing abnormal pressure change which would otherwise accompany phase change in each of the main gas chambers S1Ra, S1La, S2Ra and S2La and auxiliary gas chambers S1Rb, S1Lb, S2Rb and S2Lb. Via check valve 10e, the compressed air flows from the compressor 10b side to each of the air suspensions S1R, S1L, S2R and S2L side. The check valve 10e checking portion opens in feeding the compressed air, and closes its checking portion in discharging the compressed air to discharge the compressed air through the fixed restriction. A discharging valve 10f is an electromagnetic valve of a 2-port 2-position spring off-set type. The discharging valve 10f normally interrupts the air passage shown in FIG. 2, but when discharging the compressed air from the air suspension S1R, S1L, S2R and S2L, the discharging valve 10f changes to connect the air passages and discharge the compressed air to the atmosphere via the check valve 10e with the fixed restriction and the air drier 10d.

Air spring feed and discharge valves V1R, V1L, V2R and V2L function to adjust the vehicle height, and are provided between the air suspensions S1R, S1L, S2R and S2L, and the above-mentioned compressed air feed and discharge system 10, respectively. The air spring feed and discharge valves V1R, V1L, V2R and V2L are 2-port and 2-position electromagnetic valves of spring off-set type. The air spring feed and discharge valves V1R, V1L, V2R and V2L normally interrupt the air passage shown in FIG. 2, and connect the air passage in adjusting the vehicle height. Namely, if the air spring feed and discharge valves V1R, V1L, V2R and V2L connect the air passage, the compressed air can be fed or discharged between the main gas chambers S1Ra, S1La, S2Ra and S2La. If the air is fed, the volumes in the main gas chambers S1Ra, S1La, S2Ra and S2La are increased to raise the vehicle height, and if the air is discharged due to the vehicle weight itself, the volumes thereof are decreased. In addition, if the air passage of the feed and discharge valves V1R, V1L, V2R and V2L is interrupted, the vehicle height remains unchanged. Thus, by controlling the connection and disconnection between the above-mentioned discharging valve 10f of the compressed air feed and discharge system and each of the above-mentioned feed and discharge valves V1R, V1L, V2R, and V2L, it is possible to adjust the vehicle height by altering the volumes of the main gas chambers of the air suspensions S1R, S1L, S2R and S2L respectively.

A vehicle speed sensor SE1 is provided in a speedometer and outputs signals in response to the vehicle speed. Each signal output from the vehicle height sensors H1R, H1L, H2C and the vehicle speed sensor SE1 is input to an electronic control unit (ECU) 4. The ECU processes the data of all signal and performs the proper controls as need. The ECU 4 outputs driving signals to the air suspension actuators A1R, A1L, A2R and A2L, to the air spring feed and discharge valves V1R, V1L, V2R and V2L, and to the solenoids for the compressed air feed and discharge valve 10f.

Set forth below is an explanation of the main parts which constitute the air suspensions S1R, S1L, S2R and S2L referring to FIGS. 3 and 4. All of suspension have a similar construction. The right rear air suspension S2R is hereinafter described in detail.

Figure 3:
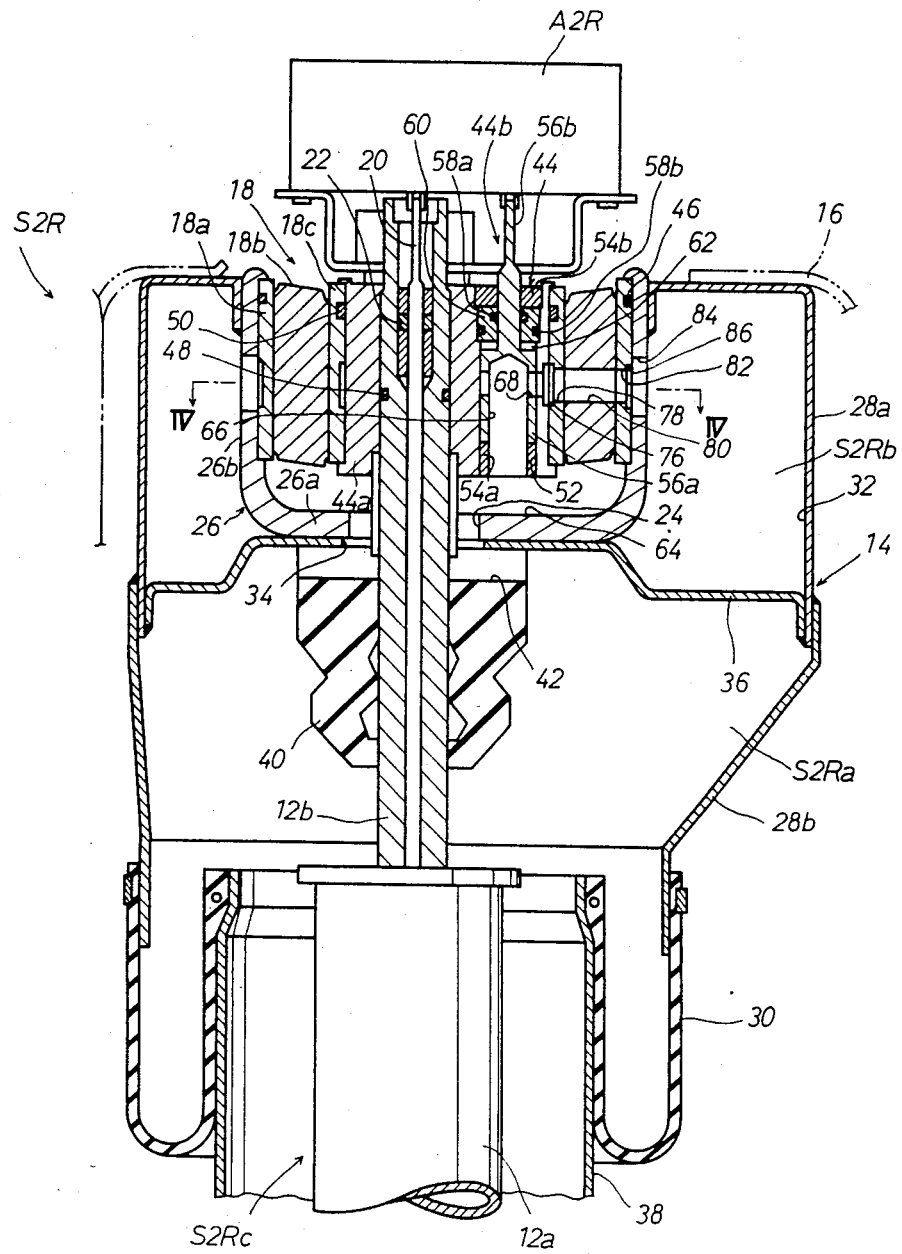
FIG. 3 is a sectional view of a main part of an air suspension.

The air suspension S2R includes a shock absorber S2Rc having a piston and a cylinder, and an air spring unit 14 provided in connection with the shock absorber, shown in FIG. 3.

An axle (not shown) is supported at the lower end of the cylinder 12a of the shock absorber S2Rc. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber S2Rc allows the changing of its damping force for adjustment to by operating the valve function of the piston. A control rod 20 for adjusting the damping force is fluid-tight and rotatably fitted with a sealing member 22 in the piston rod 12b.

The air spring unit 14 has a chamber 32 which is defined by a circumferential member 26 comprising a bottom 26a provided with an opening 24, through which the piston rod 12b is allowed to extend, and a wall 26b rising from the peripheral portion of the bottom 26a, an upper housing member 28a covering the circumferential member 26 and secured on the vehicle boody, a lower housing member 28b open at the lower end and coupled to the lower end of the upper housing member 28a, and a diaphragm 30 made of an elastic material and closing the lower end of the lower housing member 28b. The chamber 32 is divided into a lower main gas chamber S2Ra and an upper auxiliary gas chamber S2Rb by a partition member 36 secured on the bottom 26a of the circumferential member 26 and having an opening 34 corresponding to the opening 24 provided in the bottom 26a. Both the chambers S2Ra and S2Rb are filled with compressed air. The partition member 36 is fitted with a buffer rubber 40 which can be brought into contact with upper end of the cylinder 12a. The buffer rubber 40 has a passage 42 for connecting the openings 24 and 34 to the main gas chamber S2Ra. The elastic cylindrical assembly 18 is disposed inside the circumferential member 26 whose wall 26b defines the inside circumferential surface of the auxiliary gas chamber S2Rb, in such manner that the assembly 18 surrounds the piston rod 12b.

The cylindrical elastic assembly 18 is provided with a valve unit 44 for controlling the connection of both the gas chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18c. The outer cylinder 18a of the assembly 18 is press-fitted on the wall 26b of the circumferential member 26 secured on the vehicle body, under the force of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically connected to the vehicle body by the cylindrical elastic assembly 18. An annular air sealing member 46 is tightly packed in between the outer cylinder 18a and the wall 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is opened at both the ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which connects with the main air chamber S2Ra through the openings 24 and 34 and the passage 42 of the buffer rubber 40, is formed in the lower portion of the elastic cylindrical assembly 18. The main portion 56a of the valve 44b has a recess 66 open to the chamber 64, and has a connection passage 68 extending through the main portion 56a in a diametrical direction thereof across the recess 66.

Figure 4:
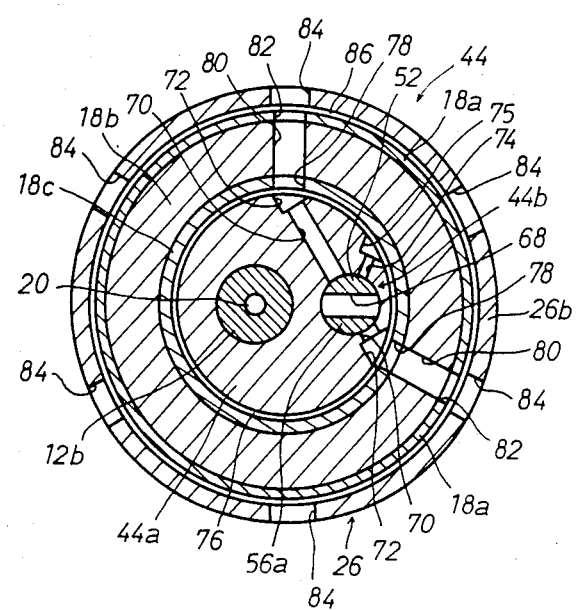
FIG. 4 is a cross sectional view taken on line IV—IV in FIG. 3.

The valve casing 56b, which houses the valve 56a, has a pair of air passages 70, each of which can connect at one end with the connection passage 68, as shown in FIG. 4.

The air passages 70 extend substantially in the same plane outwards in a diametrical direction of the hole 52, toward the peripheral surface of the valve 44b. The other end of each air passage 70 is open to the peripheral surface of the valve casing 44a through a face hole 72. An air passage 74, which can connect at one end with the connection passage 68, extends on substantially the same place to the pair of air passages 70 toward the peripheral surface of the valve casing 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b corresponding to the openings 78. The through holes 80 are opened to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with a plurality of openings 84 which are located at equal intervals in the circumferential direction of the member 26 and extend continuously to the auxiliary gas chamber S2Rb to connect the openings 78 and 82 and the through holes 80 with the auxiliary gas chamber S2Lb. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided corresponding to the two air passages 70 of the valve casing 44a in the embodiment shown in FIG. 4, the air passages 70 and 74 can optionally be provided in positions in the circumferential direction of the elastic member 18b because the annular air passage 76, with which the air passages 70 and 74 connect, is formed between the inner cylinder 18c and the valve casing 44a.

The control rod 20 for adjusting the damping force of the shock absorber S2Rc, and an actuator A2R for rotating the valve 44b of the valve unit 44, are provided at the upper end of the piston rod 12b, as shown FIG. 3.

Since the air suspension S2R has the above-mentioned construction, the air suspension performs actions described hereinafter.

When the valve 44b is kept in such a closed position shown in FIG. 4 wherein the connection passage 68 of the valve disconnects from any of the air passages 70 and 74 of the valve casing 44a, the main gas chamber S2Ra and the auxiliary gas chamber S2Rb are disconnected from each other so that the spring constant of the suspension S2R is set at a large value.

When the actuator A2R has rotated the valve 44b into such a position that the connection passage 68 of the valve connects with the large-diameter air passages 70 of the valve casing 44a, the main gas chamber S2Ra is connected with the auxiliary gas chamber S2Rb through the connection passage 68 communicating with the main gas chamber, the large-diameter air passages 70 and the openings 78 and through holes 80 of the elastic assembly 18 and the openings 82 and 84, so that the spring constant of the suspension S2R is set at a small value.

When the valve 44b is rotated into such a position by the actuator A2R that the connection passage 68 of the valve connects with the small-diameter connection passage 74 of the valve casing 44a, the main gas chamber S2Ra is connected to the auxiliary gas chamber S2Rb through the connection passage 68 connecting with the main gas chamber, the small-diameter air passage 74, the air passage 76, the openings 78 and through holes 80 of the elastic assembly 18 and the openings 82 and 84, so that the spring constant of the suspension S2R is set at an intermediate value because the small-diameter air passage 74 provides a higher air flow resistance than the large-diameter air passages 70.

Figure 5:
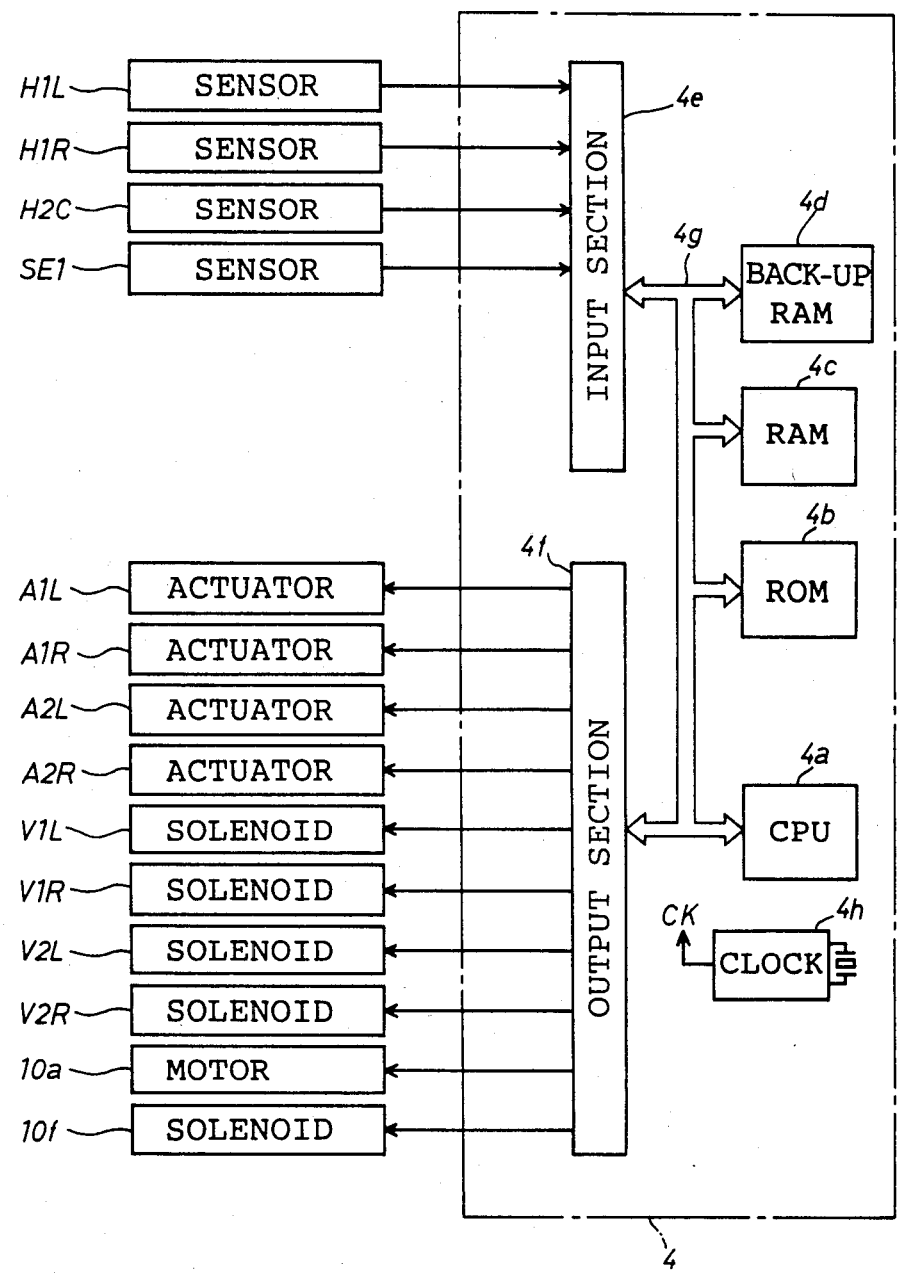
FIG. 5 is a block diagram of FIG. 2.

FIG. 5 shows the structure of ECU 4. A central process step unit (CPU) 4a receives the output data from the sensors and performs operations on the data, in response to a control program, to carry out process steps for the control of various units or means or the like. A read-only memory (ROM) 4b stores the control program and initial data. A random-access memory (RAM) 4c stores or reads out the data, which are entered in the ECU 4, or are necessary for operation control. A backup random-access memory (backup RAM) 4d is backed up by a battery so that even if the ignition key switch of the automobile is turned off, the backup RAM retains data which are needed after the turning-off of the switch. An input section 4e includes an input port (not shown), a waveshaping circuit provides if necessary, a multiplexer which selectively sends out the output signals of the sensors to the CPU 4a, and an A/D converter which changes an analog signal into a digital signal. An output section 4f includes an output port (not shown), and a drive circuit for driving the actuators in response to the control signals of the CPU 4a as occasion demands. The ECU 4 also includes a bus line 4g and a clock circuit 4h. The bus line 4g connects element, such as the CPU 4a, the ROM 4b, and the input and output sections 4e and 4f. Data from each above-described element is transmitted to the bus line 4g. The clock circuit 4h sends a clock signal providing the control timing at a predetermined time interval to the CPA 4a, the ROM 4b, and the RAM 4c. The clock circuit 4h sends out a clock signal at preset intervals to the CPU 4a, the ROM 4b, the RAM 4c so that a control timing is set by the clock signal.

Figure 6:
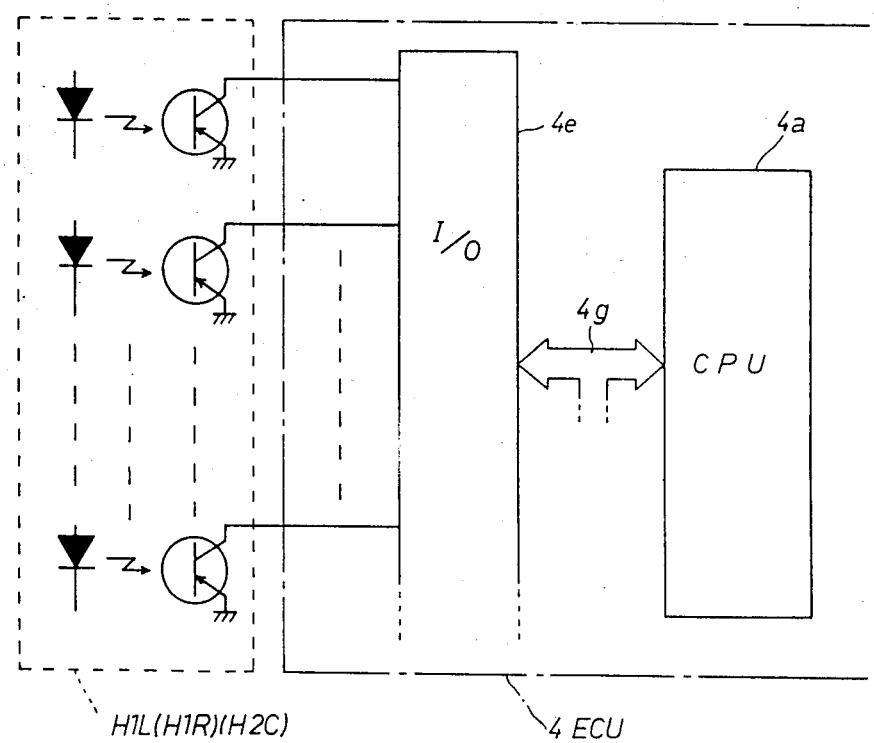
FIG. 6 is a digital type front height sensor and a corresponding input circuit of a ECU.
Figure 7:
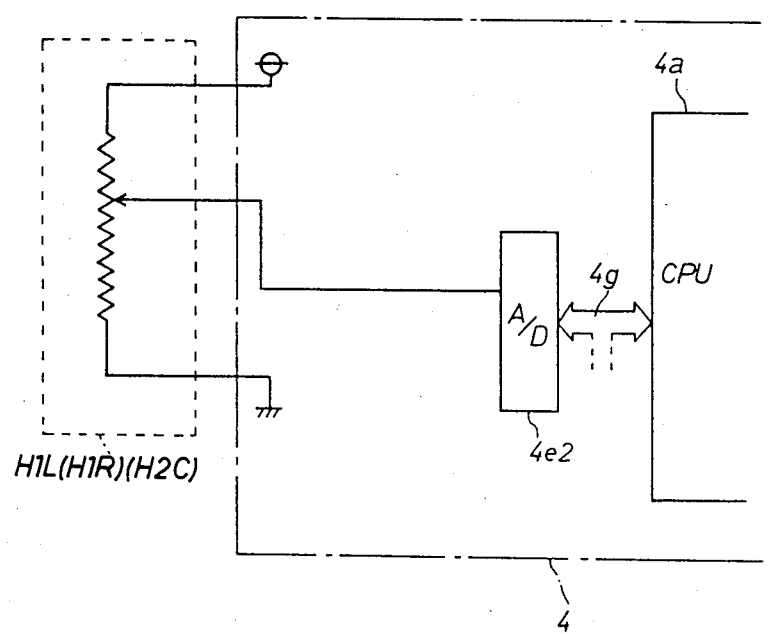
FIG. 7 is an analog type front height sensor and a corresponding input circuit of the ECU.

If the vehicle height sensors H1R, H1L and H2C are of the type having a plurality of light interrupters providing output digital signals, the signals are transmitted to the CPU 4a via the input section 4e as shown in FIG. 6. If the vehicle height sensors H1R, H1L and H2C output analog signals, a system shown in FIG. 7 is provided. In the latter case, an analog voltage signal indicative of the vehicle height is input to the ECU 4, and is converted into a digital signal, and is output to the CPU 4a via bus line 4g.

Figure 8:
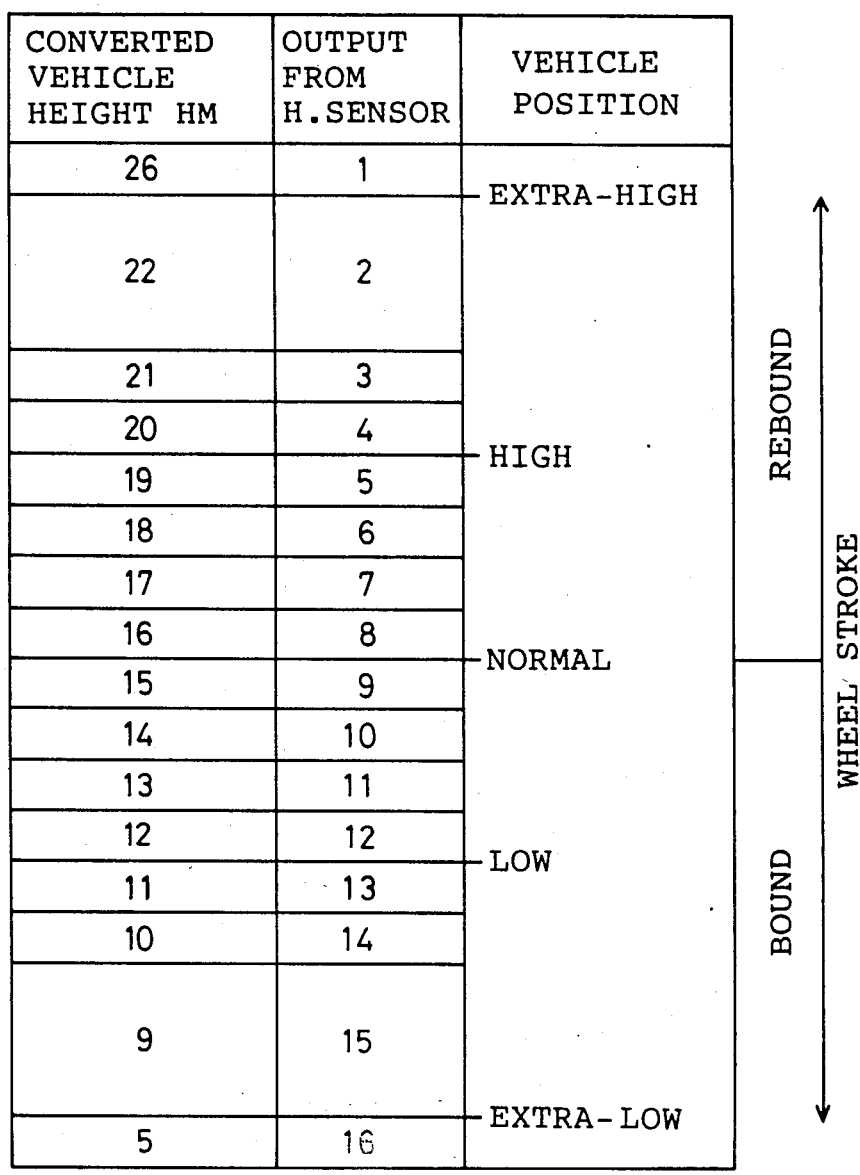
FIG. 8 is a diagram illustrative of the relationship between converted vehicle height and the out put of a height sensor.

Hereinunder is an explanation of converted vehicle height HM utilized to execute the control according to the first embodiment of the present invention referring to FIG. 8. The vehicle height sensors H1L and H1R noted as above detect the distance between the wheel and the vehicle body. As shown in FIG. 8, the sensor outputs 4-bit data of 16 levels, centering on the normal position of the vehicle height. When the wheel goes onto a bump, the output data go to a low or extra-low position indicative of the bounded state. When the wheel is caught in a dip, the output data go to high or extra-high position indicative of the rebounded state. A table shown in FIG. 8 defines the relation between the output data from the vehicle height sensor and the corresponding converted vehicle height HM, and the table is stored in a predetermined area in a ROM 4b. The ECU 4 converts the output from the front vehicle height sensors H1L and H1R into converted vehicle height HM in accordance with the table and performs an alteration operation of the suspension characteristic according to the converted vehicle height HM. Here, the value of the converted vehicle height HM is not arranged at equal interval in the table, when the vehicle height is extra-high or extra-low position. This provision is for preventing the bottoming of the vehicle by quickly detecting large road irregularities and altering the suspension characteristic. Accordingly, the first embodiment performs the alteration control in such a way that the more the vehicle height approach to the extra-low position or extra-high position, the more rapidly the alteration control is executed.

Figure 9:
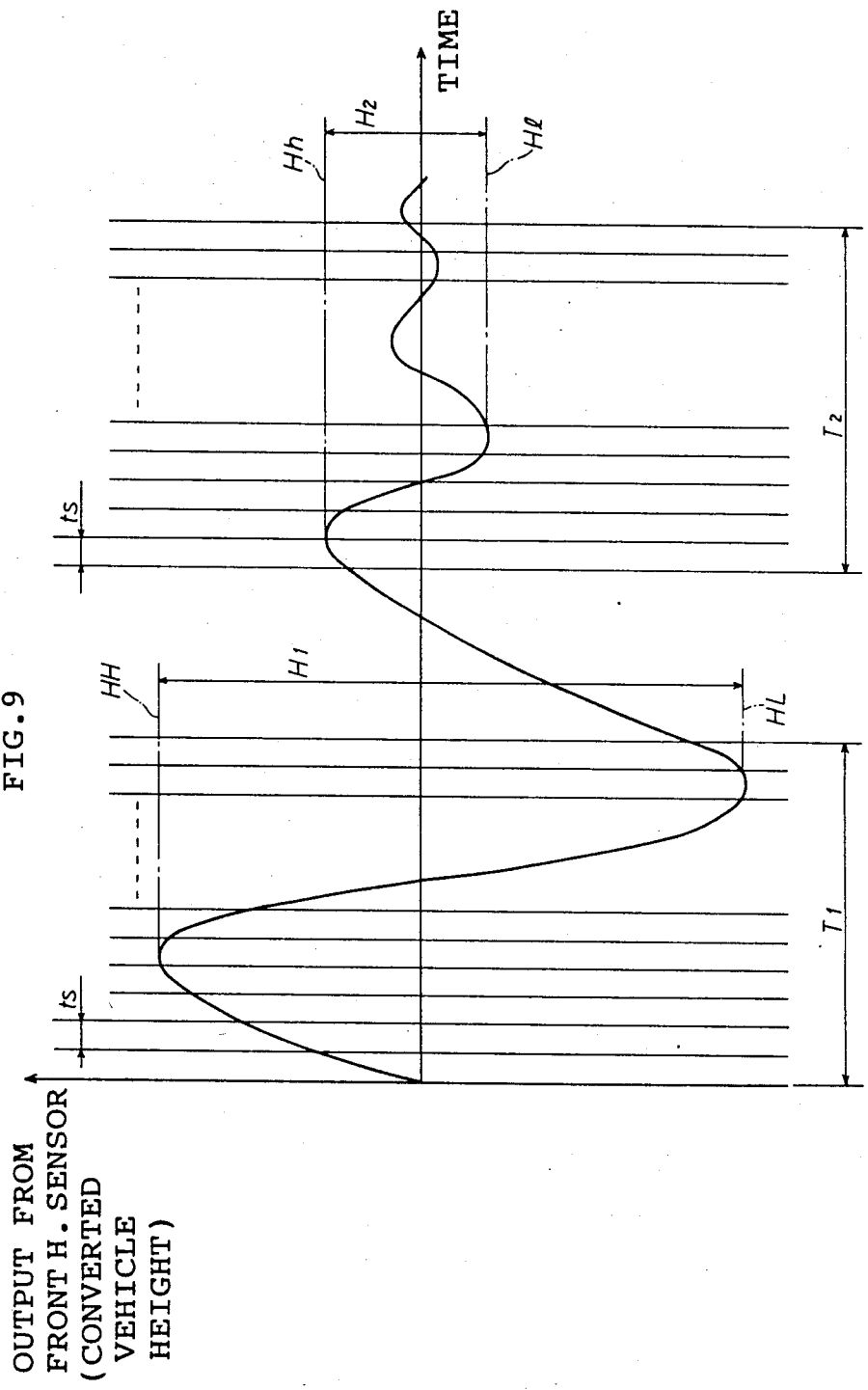
FIG. 9 is a diagram illustrative of the relationship between the time and the out put of a front height sensor.
Figure 11:
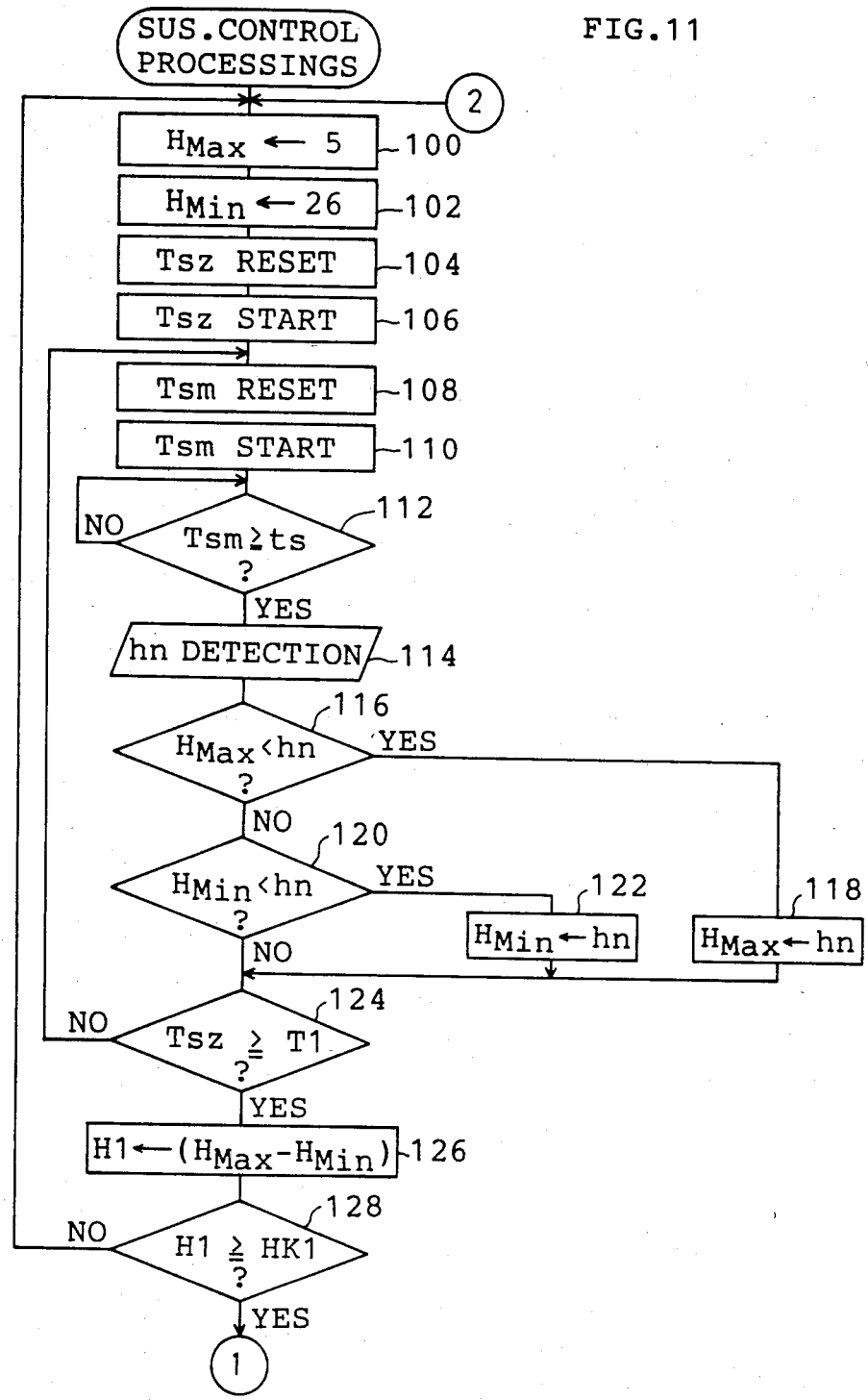
FIG. 11 thru FIG. 18 are flow charts illustrative of the operation of the computer of FIG. 5 for providing suspension control of the first embodiment.
Figure 12:
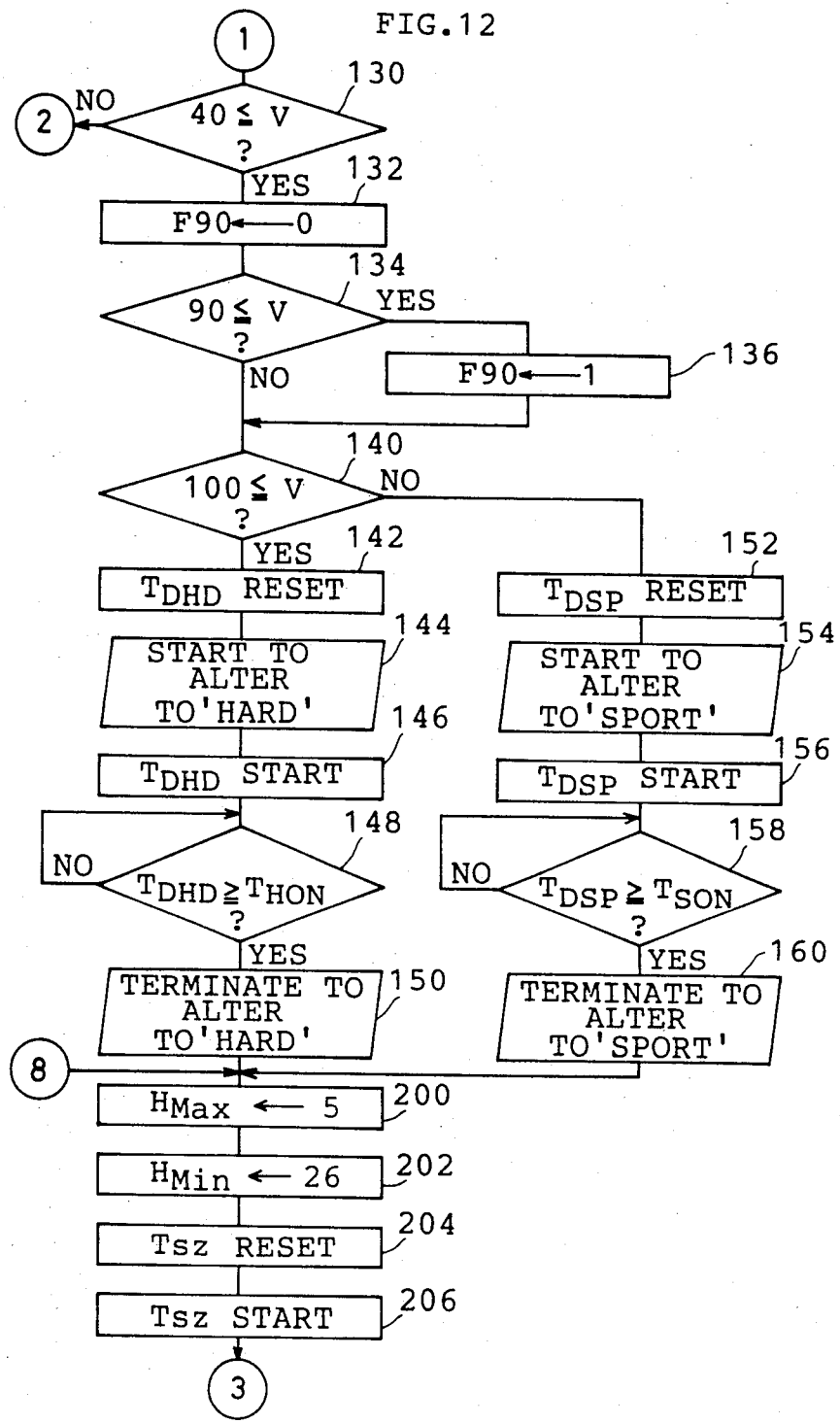
Figure 13:
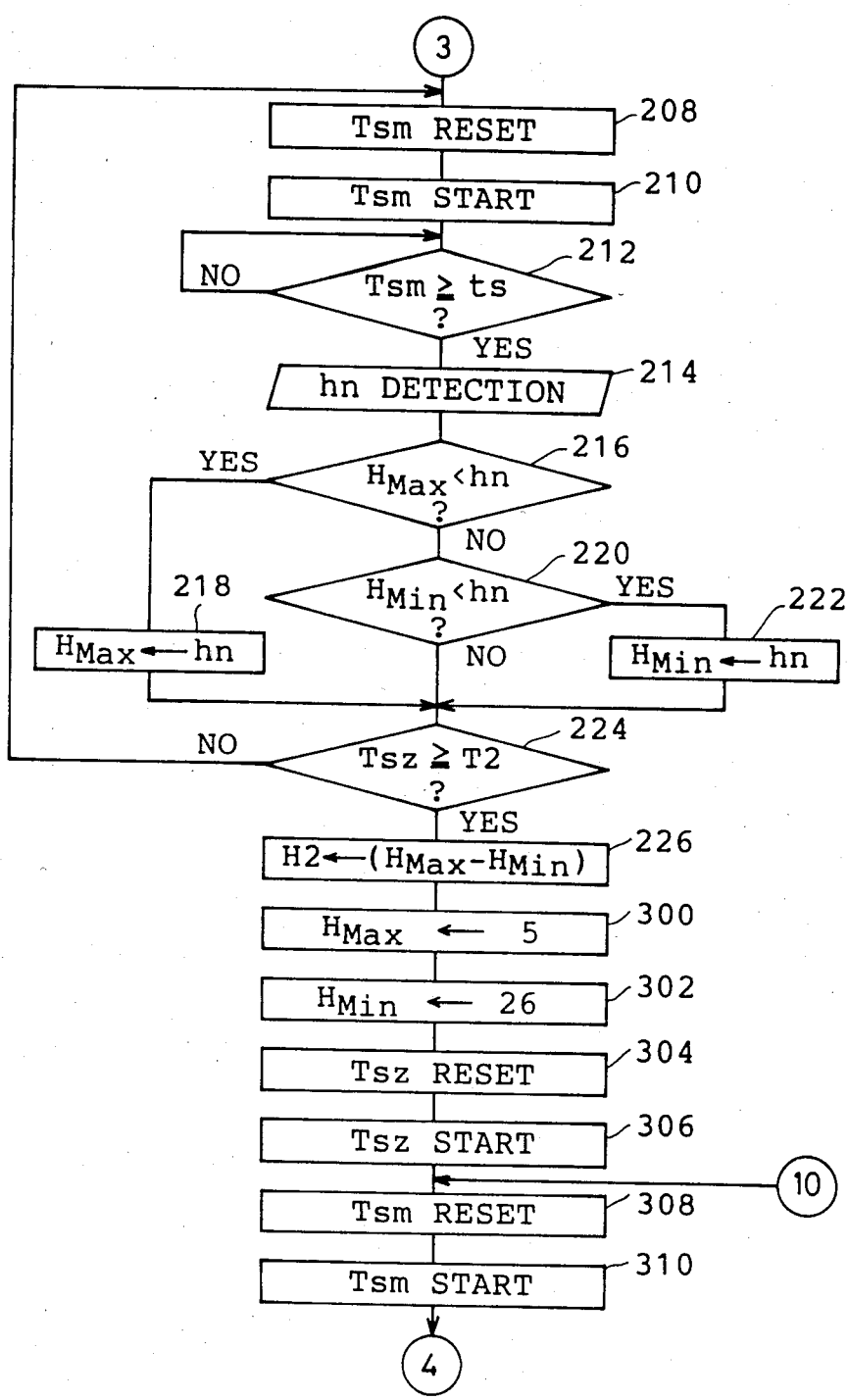
Figure 14:
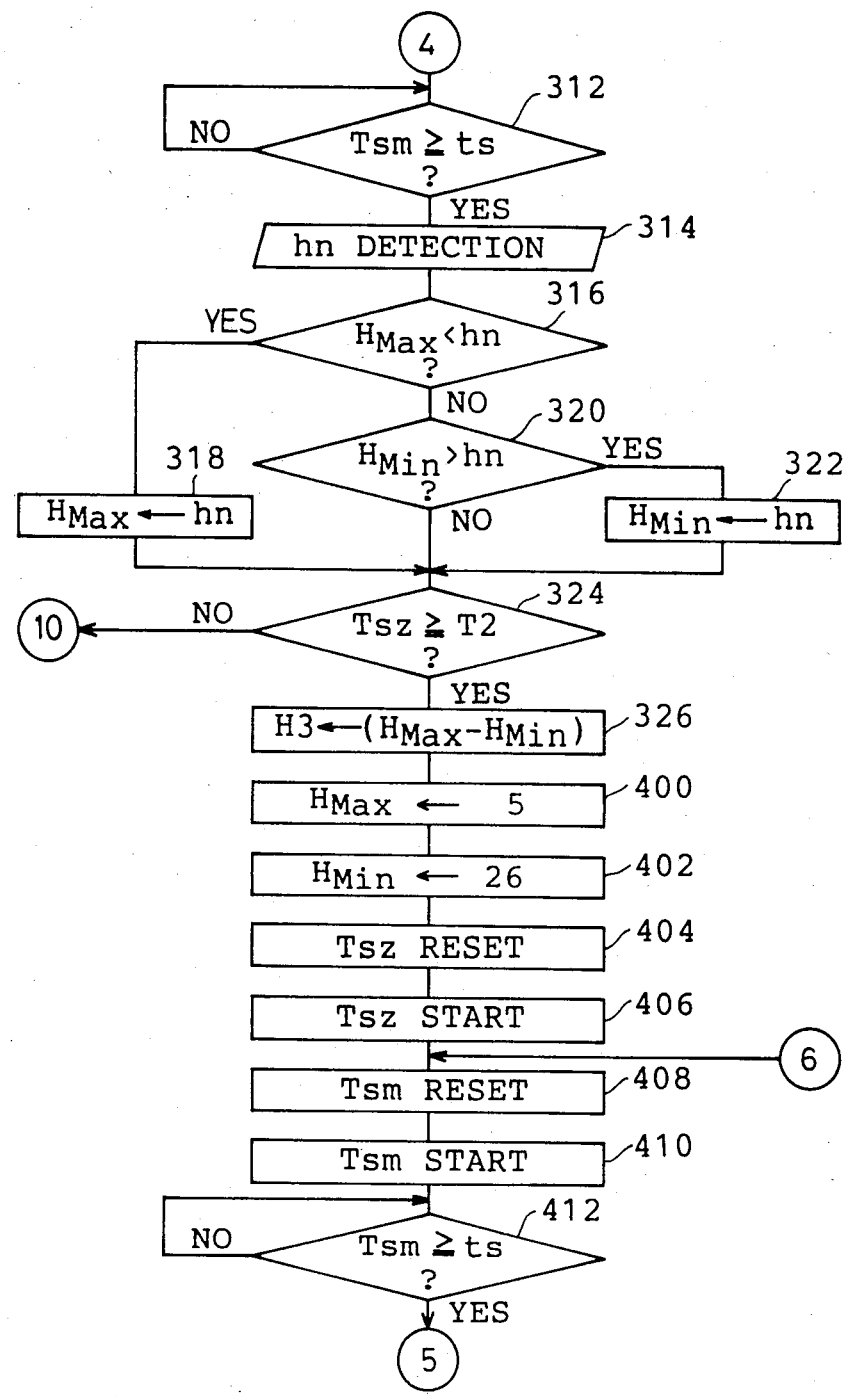
Figure 15:
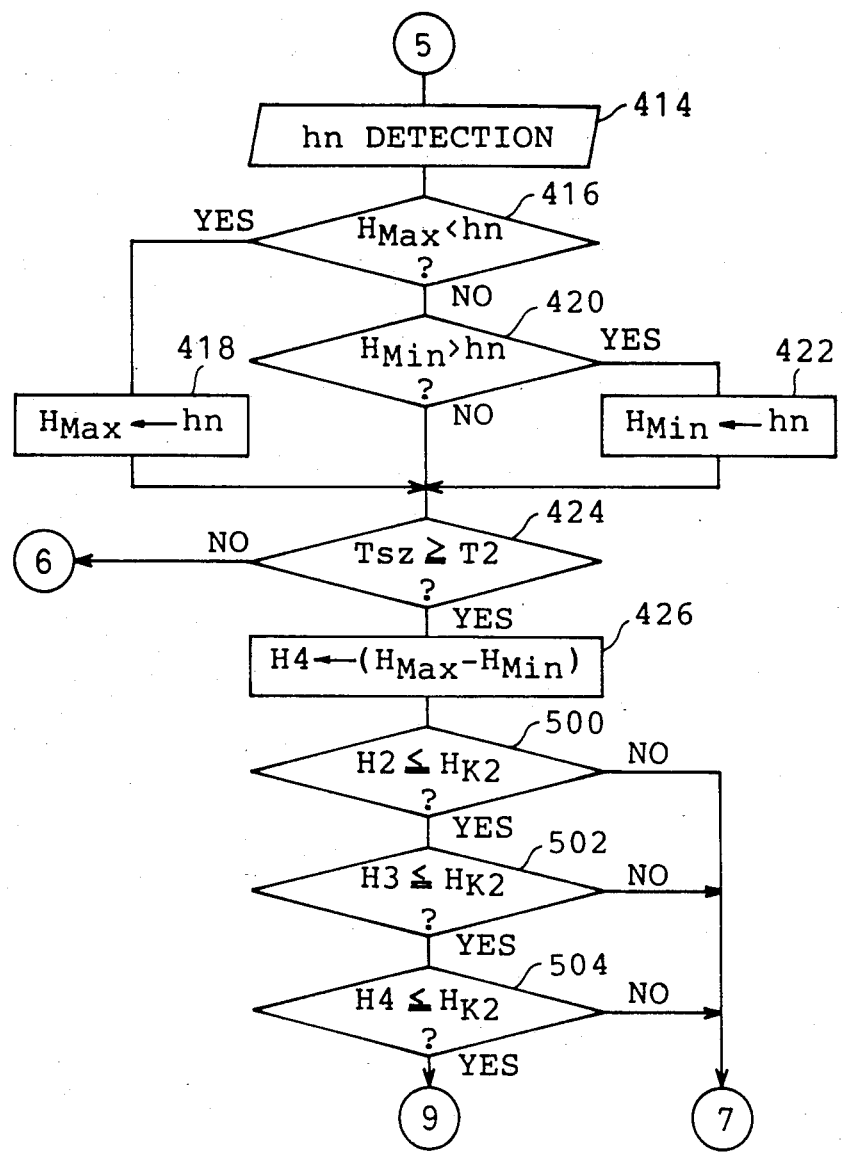
Figure 16:
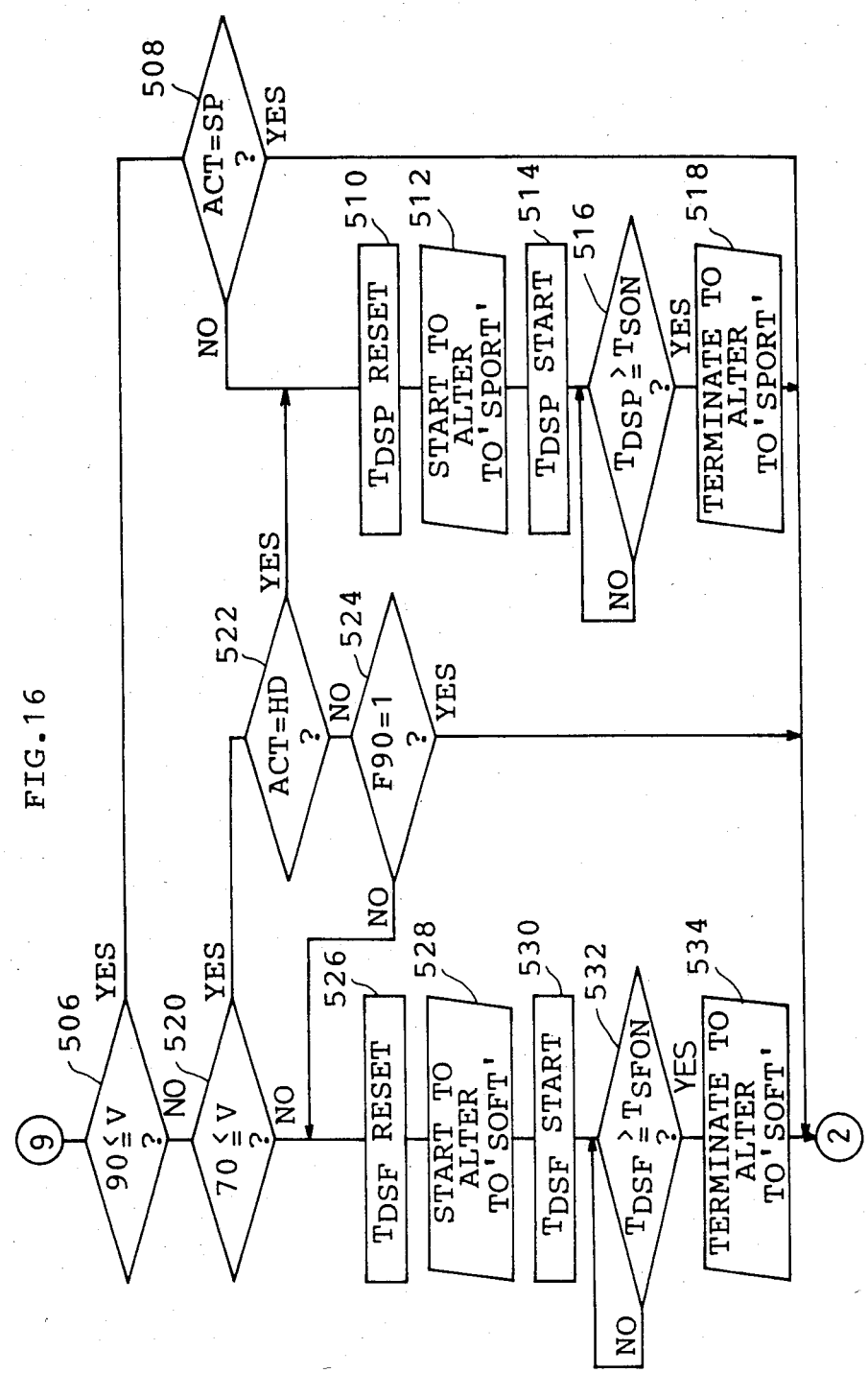
Figure 17:
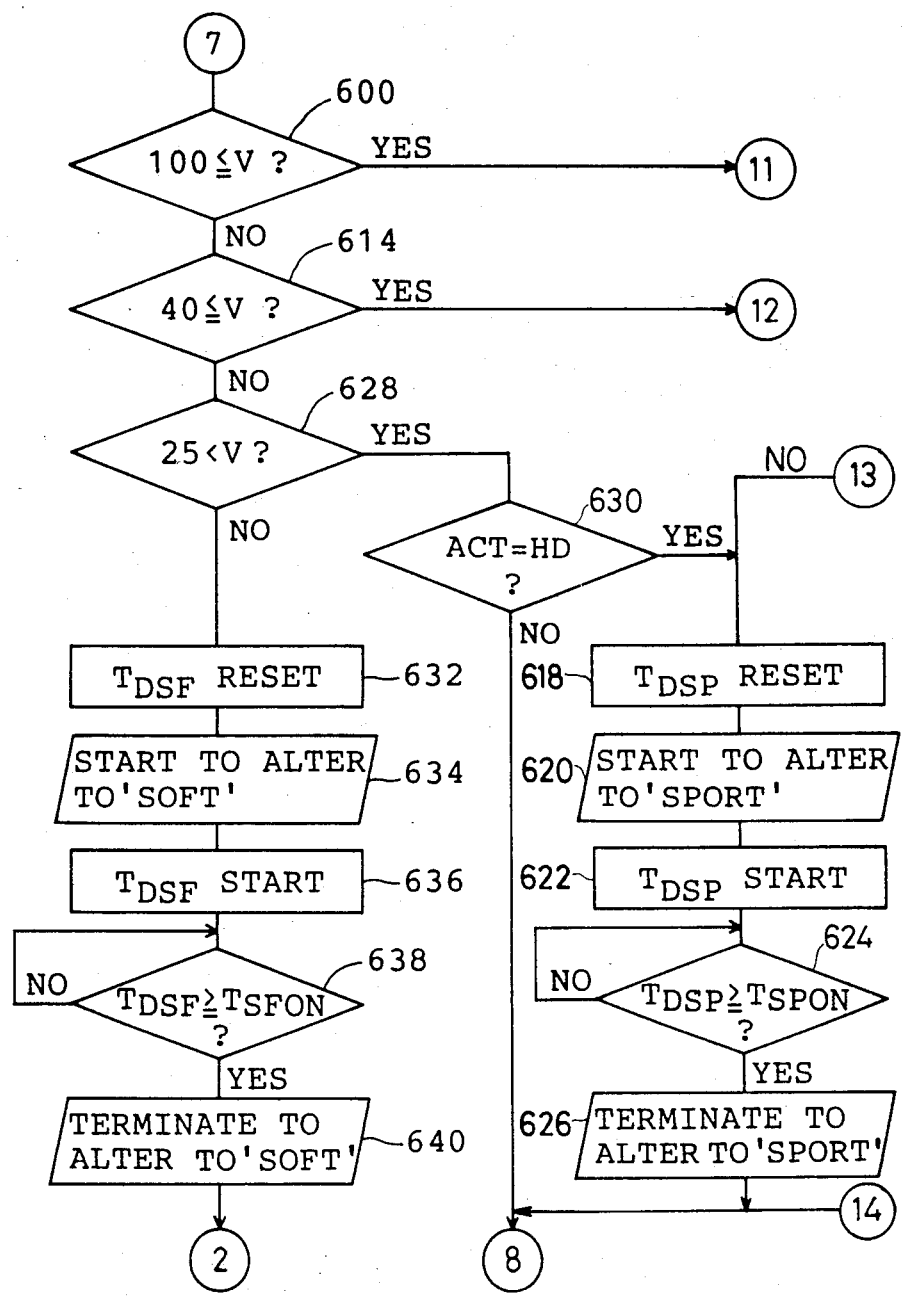
Figure 18:
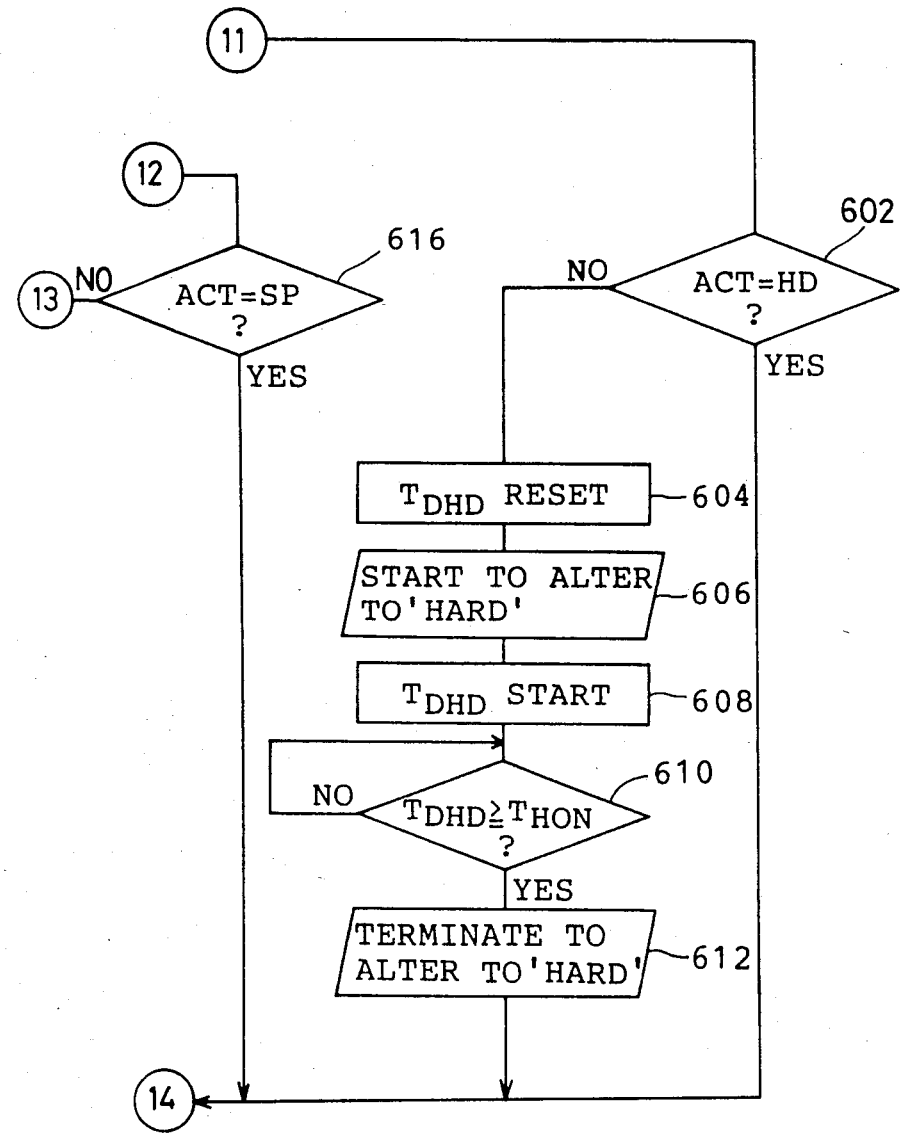

Hereinunder is an explanation of the relation among the vehicle height change, detection time interval, and determination time interval referring to FIG. 9. As shown in FIG. 9, a time interval ts is a vehicle height detecting time interval for detecting the output from the vehicle height sensors H1L and H1R. The time interval may be preset at 8 sec., for example, in the embodiment. Furthermore, T1 is an alteration determination time interval for determining if the suspension characteristic is to be altered. The time interval T1 is derived from the following formula:

$$T1 = (N1 - 1) \times ts \tag{1}$$

where, N1 designates the number of times that the alteration vehicle height is detected, it is 64 times according to the present embodiment.

For altering the suspension characteristic, a first operation is to calculate the maximum vehicle height change H1 within the alteration determination time interval T1 from the maximum vehicle height HH and the the minimum vehicle height HL as follows:

$$H1 = HH - HL \qquad (2)$$

where, each vehicle height in the formula (2) designates converted vehicle height corresponding to the detected vehicle height. If the maximum vehicle height change H1 is greater than or equal to a first reference value HK1, the suspension characteristic is altered from SOFT state to SPORT state, or in another case from SPORT state to HARD state. According to the present embodiment, the first reference value HK1 (FIG. 8) is 11, in the converted vehicle height unit. A time interval T2 indicates a time interval for determining if the suspension characteristic is to be returned or not to be returned, and the restoring time interval T2 is derived from the following formula:

$$T2 = (N2 - 1) \times ts \qquad (3)$$

where, N2 designates the number of times that the vehicle height data is detected. Here, it is detected 126 times according to the present embodiment.

For restoring the suspension characteristic, the first operation is to calculate the maximum vehicle height change H2 within the restoring determination time interval T2, from the maximum vehicle height change Hh and the minimum vehicle height H1:

$$H2 = Hh = H1 \qquad (4)$$

where, each vehicle height in the formula also represents converted vehicle height corresponding to the detected vehicle height. If the maximum vehicle height change H2 falls below the second reference value HK2 for three consecutive times, the suspension characteristic is altered from SPORT to SOFT state, or in another case, from HARD to SPORT state. According to the present embodiment, the second reference value (FIG. 8) HK2 is 8 in the converted vehicle height unit.

A speed responsive mechanism adopted to the first embodiment is explained referring to FIG. 10, which shows a table defining the relation between the suspension characteristic and vehicle speed in the case of a rough road and a smooth road. If the vehicle is determined to be running on the rough road, the suspension characteristic is set as follows; a SOFT state in response to a vehicle speed being less than 25 km/h; selectively in SOFT, SPORT, and HARD state during acceleration, in response to the vehicle speed being less than 40 km/h, from 40 km/h to 100 km/h, and 100 km/h or above, respectively; and in SPORT state during deceleration in response to the vehicle speed being from 25 km/h to 40 km/h.

On the contrary, if the vehicle is determined to be running on the smooth road, the suspension characteristic is set as follows; in SOFT state in response to a vehicle speed being less than 70 km/h; selectively in SOFT and SPORT states during acceleration, in response to the vehicle speed being from 70 km/h to 90 km/h and from 90 km/h higher, respectively; and in SPORT state during deceleration in response to the vehicle speed being from 70 km/h to 90 km/h.

It is due to the consideration of the history in which the suspension characteristic is altered that the setting of the suspension characteristic depends on whether the vehicle is in an accelerated condition or a decelerated condition. For example, the suspension control system according to the present embodiment does not alter the suspension characteristic to HARD instantly when the vehicle records the speed 90 km/h or above once while driving on a rough road, then decelerated to the range from 70 km/h to 90 km/h, and finally cruises on a smooth surface.

Suspension control process steps executed by the ECU 4 according to the first embodiment are explained hereinunder referring to the flow charts shown in FIGS. 11–18. Process steps 100–128, 130–206, 208–310, 312–412, 414–504, 506–534, 618–640 including 600 and 614, 602–616 except 614 are shown respectively in FIG. 11, FIG. 12, FIG. 13, FIG. 14, FIG. 15, FIG. 16, FIG. 17, and FIG. 18.

The vehicle adopting the present suspension control system is provided with switches for selecting the suspension control modes, i.e. AUTO and MANUAL mode. The present suspension control process steps begin when the vehicle is started and accelerated, in AUTO mode. Set forth below is the summary of the suspension control process steps according to the first embodiment.

(1) The vehicle height is detected every vehicle height detection time interval ts, and the maximum vehicle height change H1 within the alteration determination time interval T1 is calculated, and then the suspension characteristic is altered selectively to SPORT and HARD state depending on the vehicle speed V when the maximum vehicle height change H1 within the time interval T1 is greater or equal to the first reference value HK1 (steps 100–160).

(2) The vehicle height is detected every detection time intervals ts, and the maximum vehicle height change within the restoring determination time interval T2 is calculated for three consecutive times, and if every maximum vehicle height change H2, H3, and H4 is less than or equal to the second reference value HK2, the suspension characteristic is returned selectively to SOFT and SPORT state depending on the vehicle speed V (steps 200–534).

(3) If at least one of the maximum vehicle height changes H2, H3, and H4 mentioned in the Paragraph (2) is greater than or equal to the second reference value HK2, the suspension characteristic is selectively altered and kept unchanged (steps 600–640).

Hereinunder is a detailed explanation of the suspension control process steps described as above. At step 100, initialization is executed by substituting 5 which is the minimum value of the converted vehicle height HM, for the maximum vehicle height $H_{Max}$. At the subsequent step 102, initialization is executed by substituting 26 which is the maximum value of the converted vehicle height HM, for the minimum vehicle height change.

At step 104, the timer Tsz for counting the alteration determination time interval T1 is reset. At step 106, the timer Tsz for counting the alteration determination time interval Tsz is started to count. At step 108, a timer Tsm for counting the vehicle height detection time interval ts is reset. At step 110, the timer Tsm for counting the vehicle height detection time interval is started to count.

The process step is advanced to step 112, where it is determined whether the counted value in the timer Tsm becomes greater than or equal to the vehicle height detection time interval ts. If the counted value in the timer Tsm does not count the value to be sufficiently great, the next process step is delayed until the time interval ts has elapsed. On the other hand, if the time interval ts has elapsed, the process step is advanced to step 114, the output from the front height sensors H1L and H1R is detected and converted into the converted vehicle height data hn. The vehicle height data hn may be converted from selectively output of the front vehicle height sensor H1L and H1R, averaged value of the right and left front vehicle height sensors, and the larger one of the two.

At the subsequent step 116, it is determined whether the above-mentioned vehicle height data hn is greater than the maximum vehicle height data $H_{Max}$. If the vehicle height data hn is greater than the maximum vehicle height $H_{Max}$, the process step is advanced to step 124 after step 118 for substituting the height data hn for the maximum vehicle height $H_{Max}$. On the contrary, if the height data hn is less than the maximum vehicle height $H_{Min}$, the process step is advanced to step 120 where it is determined whether the height data hn is less than the minimum vehicle height data $H_{Min}$. If the height data hn is determined to be less than the minimum vehicle height $H_{Min}$, the process step is advanced to 124 after step 122, where the height data hn is substituted for the minimum vehicle height $H_{Min}$.

At step 124, it is determined whether the counted value in the timer Tsz is greater than or equal to the alteration determination time interval T1. If the time interval T1 has not elapsed, the process step is returned to step 108, where the vehicle height is detected repeatedly. On the contrary, if the time interval T1 has elapsed, the process step is advanced to step 126, where the maximum vehicle height change H1 within the time interval T1 is calculated by subtracting the minimum vehicle height change $H_{Min}$ from the maximum vehicle height change $H_{Max}$.

The process step is advanced to step 128, where it is determined whether the maximum vehicle height change H1 is greater than or equal to the first reference value HK1. If H1 is less than the value HK1, the process step is returned to step 100. On the other hand, if H1 is greater than or equal to the value HK1, the process step is advanced to step 130, where it is determined whether the current vehicle speed V is 40 km/h or above. If the current vehicle speed V is less than 40 km/h, the process step returns to step 100. On the other hand, if the current vehicle speed V is 40 km/h or above, the process step is advanced to step 132 where the vehicle speed detection flag F90, which is set once the vehicle speed V exceeds 90 km/h, is reset.

At the subsequent step 134, it is determined whether the vehicle speed V is 90 km/h or above. If the vehicle speed V is 90 km/h or above, the process step is advanced to step 136 where the value of the vehicle speed detection flag F90 is set at "1", and the process step is advance to step 140. On the contrary, if the vehicle speed V is determined less than 90 km/h, the process step is advanced to step 140. At step 140, it is determined whether the vehicle speed V is 100 km/h or above. If the vehicle speed V is 100 km/h or above, the process step is advanced to step 142, where the suspension characteristic is altered to HARD state in accordance with the table for the rough road (see FIG. 10). Thus step 142 is also a process step where timer $T_{DHD}$ for counting an alteration duration time interval $T_{HON}$ is reset.

At the subsequent step 144, the suspension characteristic starts to be altered to HARD state by increasing the spring constant and the damping force of the shock absorber of the suspensions S1L, S1R, S2L and S2R that have been explained hereinabove; the rotary valve 44b and the control rod 20 start to be rotated by the operation of the actuators A1L, A1R, A2L, and A2R. At step 146, the timer $T_{DHD}$ is started to count alteration time interval. The process step is advanced to step 148, where it is determined whether the counted value by the timer $T_{DHD}$ is greater than or equal to the time interval $T_{HON}$.

If it is determined that the time interval $T_{HON}$ has elapsed, the process step is advanced to step 150, where the suspension characteristic terminates to be altered to HARD state, thus, the rotation of the actuator is stopped.

However, if the vehicle speed V is determined to be less than 100 km/h, the process step is advanced to step 152, where the suspension characteristic is altered to SPORT state in accordance with the table for the rough road in the manner as explained previously; both of the spring constant and the damping force of the shock absorbers of the air suspensions S1L, S1R, S2L, and S2R are set at an intermediate value by rotating the rotary valve 44b and the control rod 20 by means of the actuators A1L, A1R, A2L. and A2R (steps 152, 154, 156, 158, and 160).

At further steps beginning with step 200 the maximum vehicle height change H2 within the first restoring determination time interval T2 is calculated (steps 200-226).

At further steps beginning with step 300 the maximum vehicle height change H3 within the second restoring determination time interval T2 is calculated (steps 300-326).

At further steps beginning with step 400 the maximum vehicle height change H4 within the third restoring determination time interval T2 is calculated (steps 400-426). Since each of the above-mentioned three groups of the process steps is similar to the process steps where the maximum vehicle height change H1 within the alteration time interval T1 is calculated, a detailed explanation of each such process step may be found with reference to those for H1.

At steps 500, 502, and 504, it is determined whether each of the maximum vehicle height changes H2, H3, and H4 is less than a second reference value HK2 respectively.

If all of the maximum vehicle height changes H2, H3 and H4 within the restoring determination time interval T2 are less than the second reference value HK2, it is judged that vibration exerted on the vehicle body is sufficiently damped due to the the suspension characteristic having been altered, and the process step is advanced to step 506 thereafter.

If the vehicle speed V is V 90 km/h or above, with the suspension characteristic in SPORT state, the process step is returned directly to step 100 (steps 506 and 508). However, if the suspension characteristic is not in SPORT state, the suspension characteristic is restored to SPORT and the process step is returned to step 100 (step 506, 508, 510, 512, 514, 516, and 518). Either if the vehicle speed V is from 70 km/h to 90 km/h or if the vehicle speed V has once exceeded 90 km/h in the past, the suspension characteristic is restored to SPORT state, and the process step is returned to step 100 (steps 506, 520, 522, 510, 512, 514, 516, 518 and 524). However, if the vehicle speed V has not exceeded 90 km/h in the past, the suspension characteristic is restored to SOFT state and the process step is returned to step 100 (steps 506, 520, 522, 524, 526, 528, 530, 532, and 534). If the vehicle speed V is below 70 km/h, the suspension characteristic is restored to SOFT state and the process step is returned to step 100 (steps 506, 520, 526, 528, 530, 532, and 534).

On the other hand, if at least one of the maximum vehicle height changes H2, H3, and H4 within the time interval T2 exceeds the second reference value HK2, the vibration exerted on the vehicle body is determined to remain undamped, despite of the suspension characteristic having been altered. Therefore, the process step is advanced to the steps beginning with step 600. If the vehicle speed V is 100 km/h or above, with the suspension characteristic in HARD state, the process step is not advanced to the next step but returned to step 200 (steps 600 and 602). However, if the suspension characteristic is not in HARD state, the suspension characteristic is altered to HARD state, and the process step is returned to step 200 (steps 600, 602, 604, 606, 608, 610, and 612). If the vehicle speed V is from 40 km/h to 100 km/h, with the suspension characteristic in SPORT state, the process step is returned to step 200 (steps 600, 614, 616). However, if the suspension characteristic is not in SPORT state, the suspension characteristic is altered to SPORT state, and the process step is returned to step 200 (steps 600, 614, 616, 618, 620, 622, 624 and 626).

If the vehicle speed V is between 25 km/h and 40 km/h, with the suspension characteristic in HARD state, the suspension characteristic is altered to SPORT state, and the process step is returned to step 200 (steps 600, 614, 628, 630, 618, 620, 622, 624 and 626).

If the suspension characteristic is not in HARD state in the preceding case, the process step is not advanced to the next step but returned to step 200 (steps 600, 614, 628, and 630).

Furthermore, if the vehicle speed V is 25 km/h or less, the suspension characteristic is altered to SOFT state, and the process step is returned to step 100 (steps 600, 614, 628, 632, 634, 636, 638, and 640. The process steps according to the present suspension control as explained above are repeatedly executed whenever the vehicle runs on the road surface.

Figure 19:
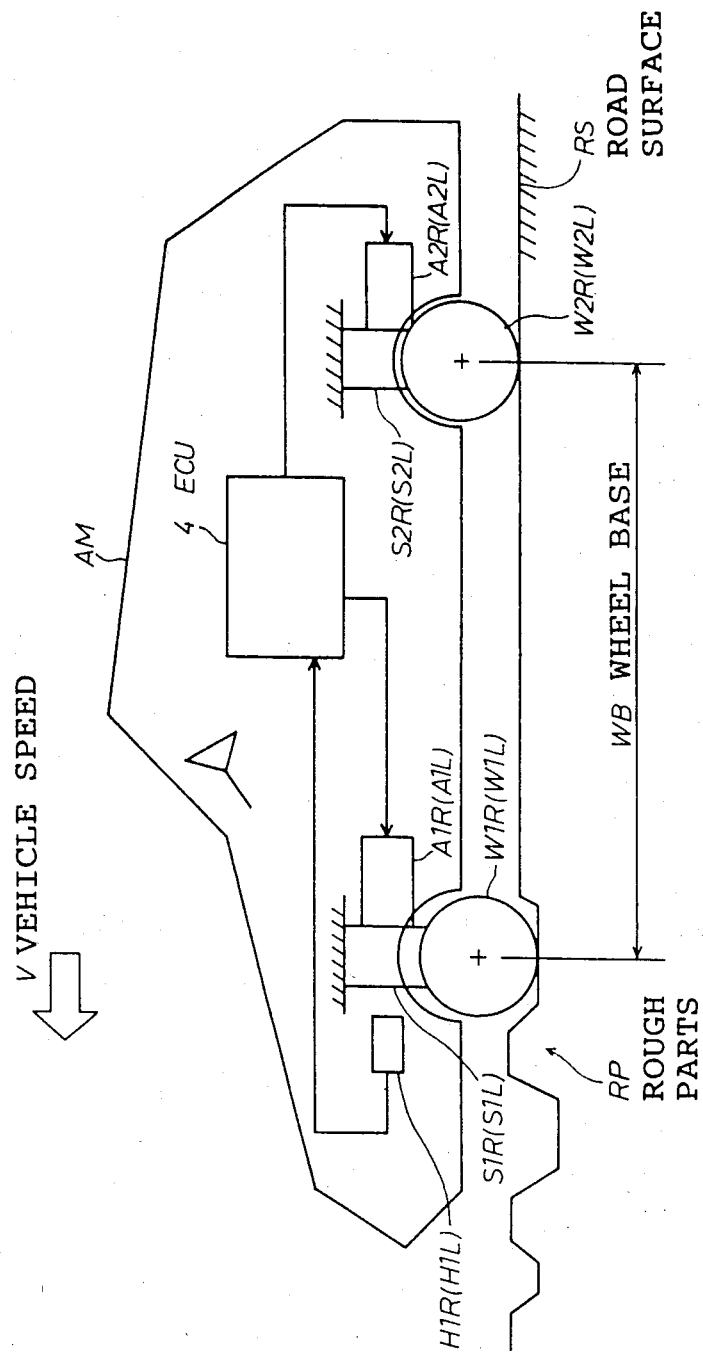
FIG. 19 is a diagram illustrative of a vehicle provided with this suspension control system dipping in the road surface.
Figure 22:
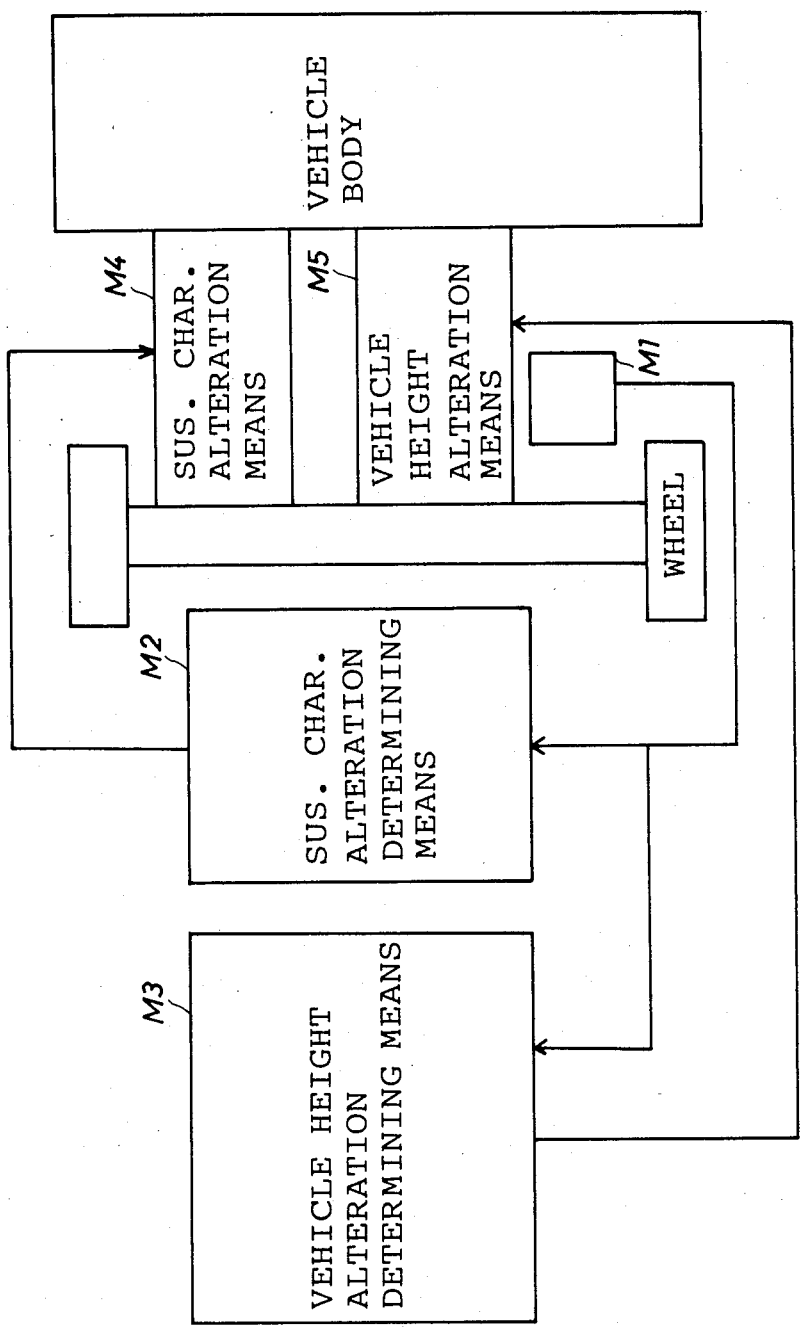
FIG. 22 is a schematic block diagram showing the principle structure of a second embodiment of the present invention.
Figure 24:
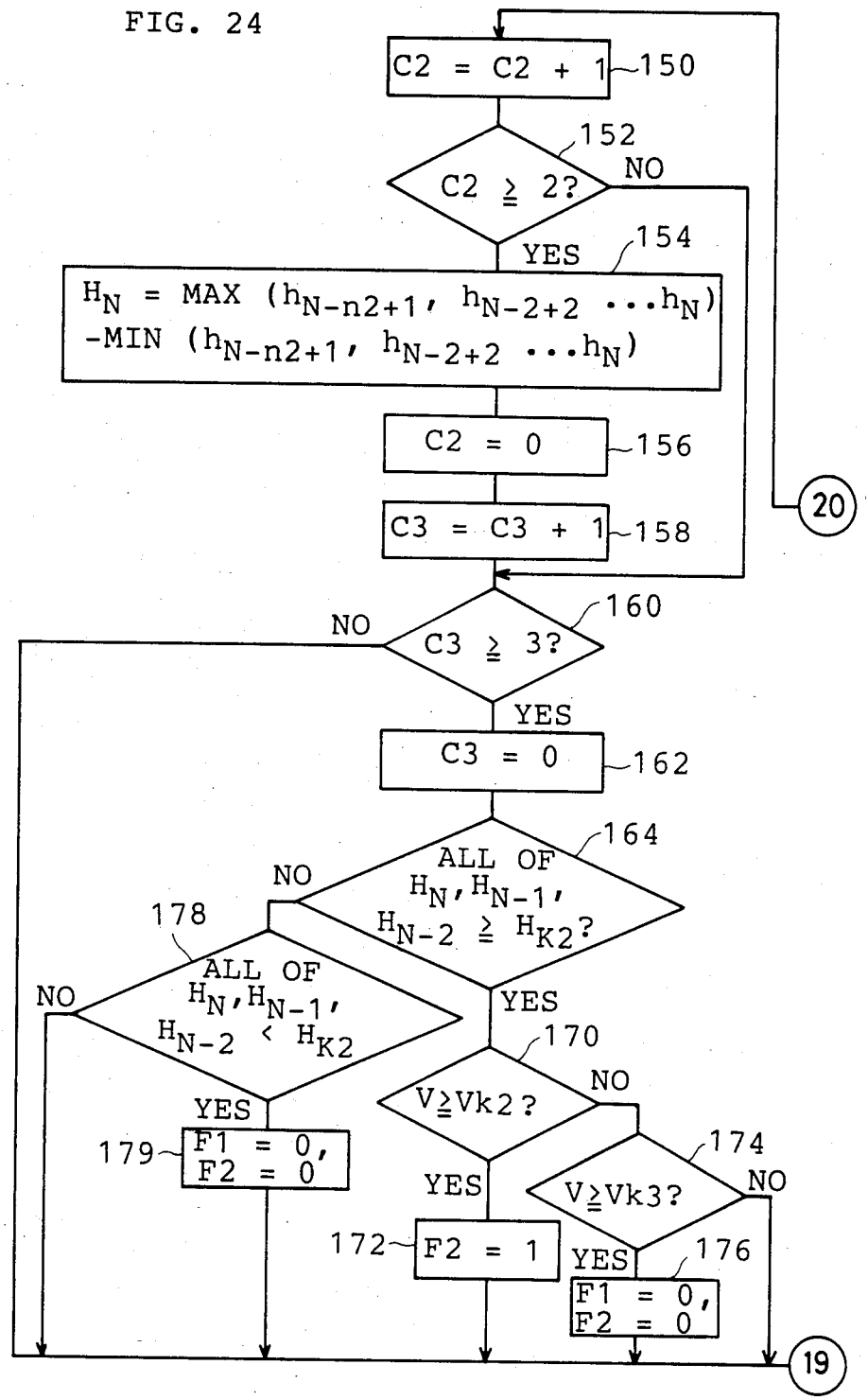
FIG. 24 thru FIG. 27 are flow charts illustrative of the operation of the computer of FIG. 4 for providing suspension control of the second embodiment.
Figure 25:
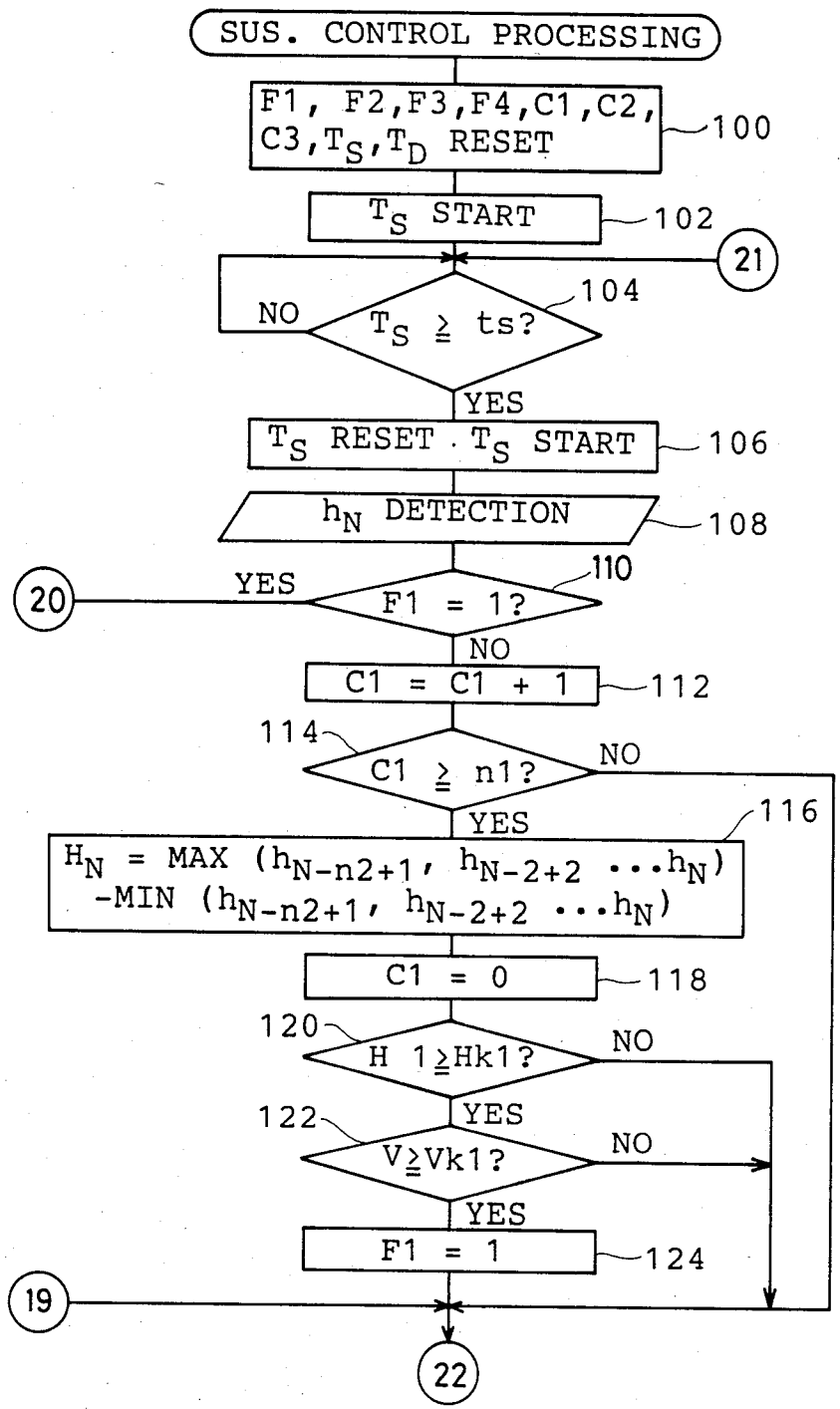
Figure 26:
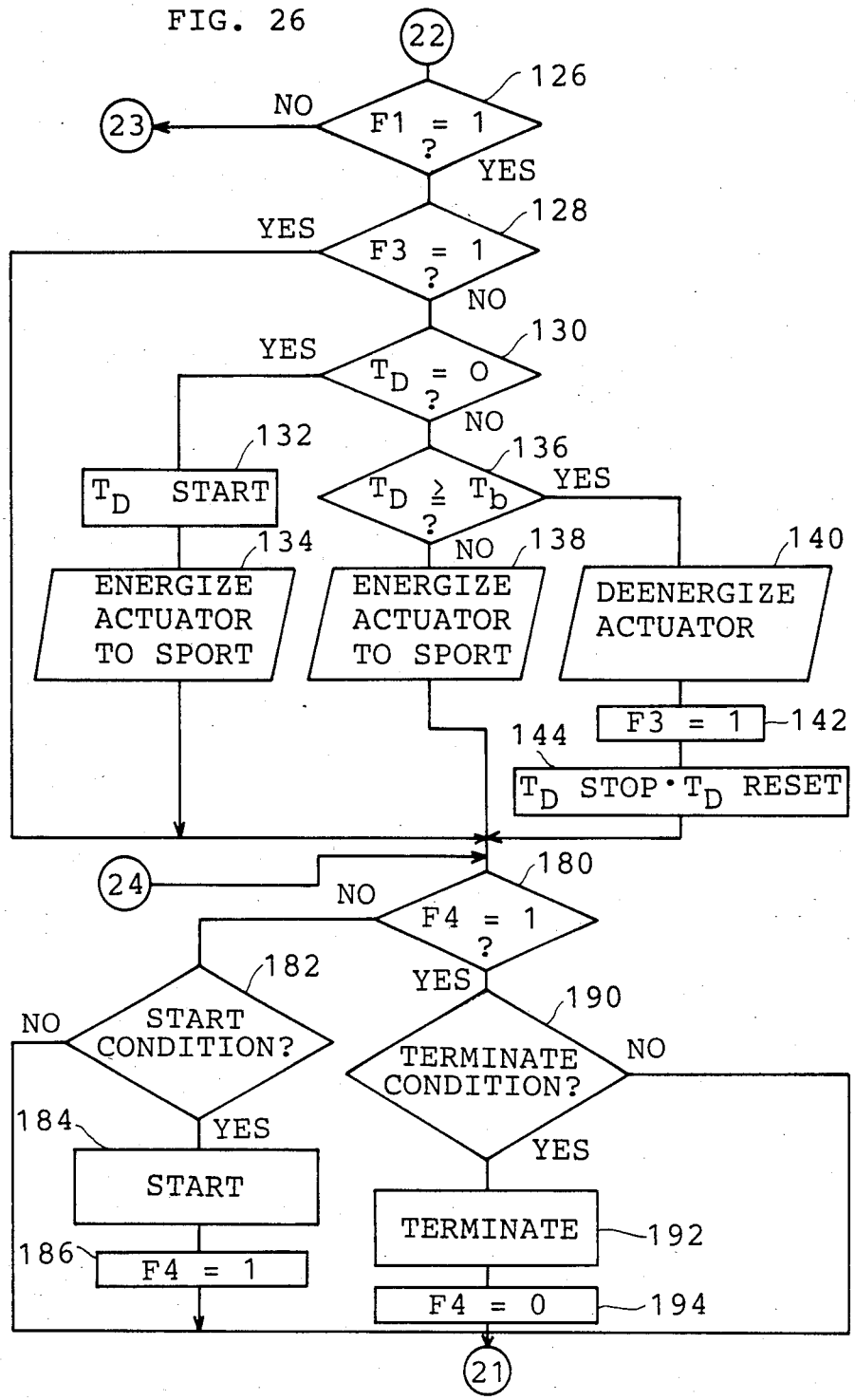
Figure 27:
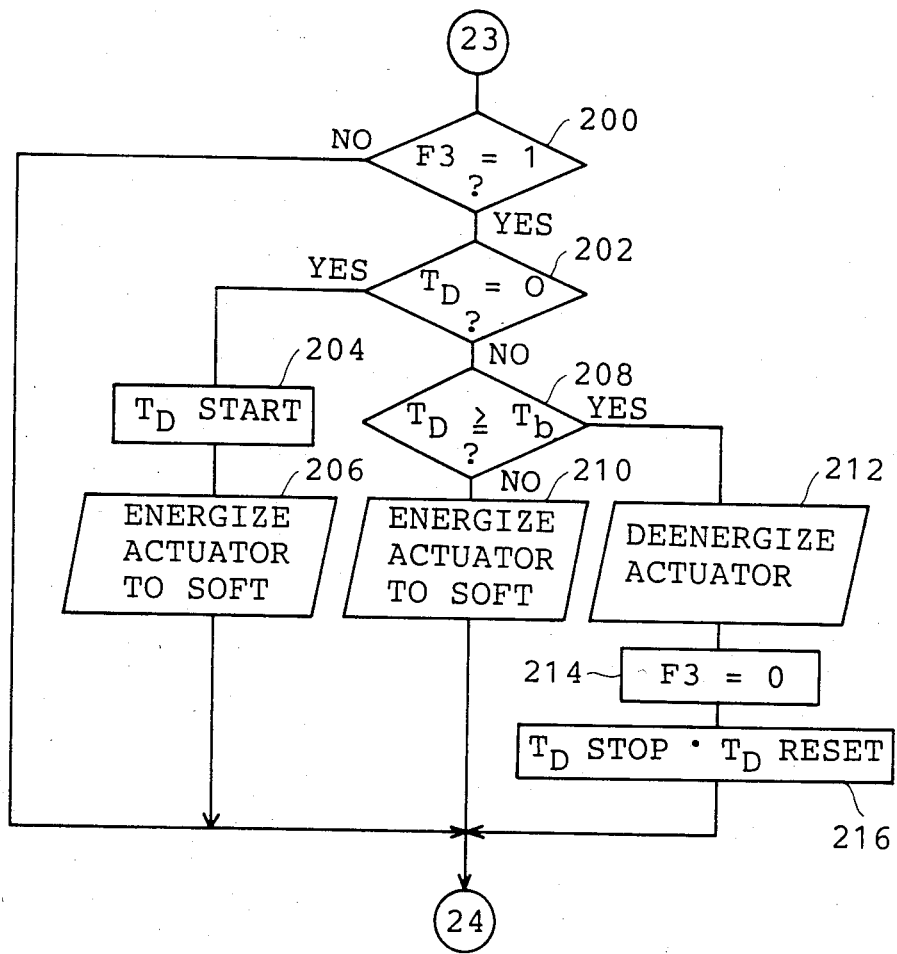

One example of control timing for executing suspension control process steps according to the first embodiment is explained hereinunder referring to FIGS. 19-21D. FIG. 19 is a schematic view in which the front wheel W1R (or W1L) is about to traverse a rough part RP followed by the continuous rough road surface when a vehicle a runs on a road surface RS at speed V km/h.

FIGS. 20A-21D are timing charts for showing the changes in output from the front height sensors H1L and H1R, driving current from the suspension characteristic alteration actuators A1R, A1L, A2R and A2L, and the suspension characteristic in relation to the elapse of time when the vehicle is in the condition shown in FIG. 19.

Referring to FIGS. 20A-D, the maximum vehicle height change H0 within the alteration determination time interval T1 between a time point t1 and a time point t2 detected by the front height sensor H1L (or H1R) is less than the first reference value HK1, as long as the vehicle AM runs on a smooth road surface RS shown in FIG. 19.

The time point t2 indicates a time point when the vehicle AM is in the condition shown in FIG. 19 in which a front wheel W1R (or W1L) of the vehicle AM is about to traverse the rough part RS. The maximum vehicle height change H1 within the time interval T1 between the time point t2 and a time point t3 detected from the height sensor H1L (or H1R) is greater than the first reference value HK1, as shown in FIGS. 20A-D. Among the vehicle height data detected every detection time interval ts, the converted vehicle heights of the maximum and the minimum vehicle height respectively takes values 21 and 10 in this case, thus the maximum vehicle height change H1 takes a value 11 which is as great as the first reference value HK1 in amount.

Therefore, the suspension characteristic alteration actuators A1R, A1L, A2R and A2L are started to be driven, or electrified, at the time point t3. Thereafter the suspension characteristic is altered from SOFT state to SPORT state at a time point t4, at which a completion time interval Ta has elapsed since the time point t3. Each actuator continues to be driven till a time point t5, at which an actuator driving time interval Tb has elapsed since the time point t4. Since the suspension characteristic is altered to HARD state at the time point t4, the vibration exerted on the vehicle body is sufficiently damped, and the output from the front height sensors H1L and H1R is ceased in the manner as indicated by the solid line in FIGS. 20A-C.

Unless the suspension characteristic is altered, the output from the front height sensors H1L and H1R is not easily ceased as indicated by the broken line shown also in FIGS. 20A-C. During a restoring determination time interval T2 between the time point t3 and a time point t6, the converted vehicle heights of the maximum vehicle height and the minimum vehcile height respectively take values 20 and 13, thus the maximum vehicle height change H2 takes value 7 which is less than the second value HK2 of 8. Furthermore, during another restoring determination time interval T2 between the time point t6 and a time point t7, the converted vehicle heights of the maximum and the minimum vehicle height respectively take values 20 and 13, thus the maximum vehicle height change H3 takes value of 7 which is less than the second reference value HK2 of 8. During a third restoring determination time interval T2 from the time point t7 to a time point t8, the converted vehicle heights of the maximum and the minimum vehicle height respectively take values 19 and 14, thus the maximum vehicle height change H4 takes value of 5 which is less than the second reference value HK2 of 8.

Accordingly, it is judged that the vibration exerted on the vehicle body has been sufficiently damped and the suspension characteristic alteration actuators A1R, A1L, A2R and A2L are started to be driven at the time point t8. At a time point t9, when the completion time interval Ta has elapsed since the time point t8, the suspension characteristic is altered from SPORT to SOFT state. Here, each actuator is driven continuously until a time point t10, when the actuator driving time interval Tb has elapsed since the time point t9.

Another example of timing charts is explained referring to FIGS. 21A-D in which the vehicle AM varies its speed V on traversing the rough part RP on the road surface. When the vehicle AM runs on the smooth road surface, the vehicle speed V exceeds 90 km/h at a time point t20. In response to the vehicle speed V exceeding 90 km/h, the suspension characteristic alteration actuators A1R, A1L, A2R and A2L are started to be driven, and the suspension characteristic is altered from SOFT to SPORT state, at a time point t21, when the completion time interval Ta has elapsed since the time point t20. At a time point t23, the front wheels W1L and W1R is about to traverse the rough part RP of the road surface. Accordingly, the maximum vehicle height change H1 within the time interval T1 between the time point t23 and a time point t24 detected by the front height sensor H1L (or H1R) is greater than the first reference value HK1. The vehicle speed V is 110 km/h at the time point t24. The suspension characteristic alteration actuators A1R, A1L, A2R and A2L start to be driven at the time point t24, and the suspension characteristic is altered from SPORT to HARD state at a time point t25, when the time interval Ta has elapsed since the time point t24. All of the maximum vehicle height changes H2, H3, and H4, during the restoring determination time interval T2 respectively between the time point t24 and the time point t27, between t27 and t28, and between t28 and t29, are greater than the second reference vehicle height HK2. Therefore, the vibration exerted on the vehicle body is judged to remain undamped, then the suspension characteristic is not returned. However, the vehicle speed V is decelerated to 60 km/h at a time point t29, when the suspension characteristic alteration actuators A1R, A1L, A2R, and A2L are started to be driven, and the suspension characteristic is returned from HARD to SPORT state at a time point t30.

All of the maximum vehicle height changes H5, H6 and H7 during the restoring determination time interval T2 respectively between the time point t29 and the time point t32, between t32 and t33, between 33 and t34, are less than the second reference vehicle height HK2. Therefore, the vibration exerted on the vehicle body is judged to be sufficiently damped, and the vehicle speed V is decreased to 50 km/h at a time point t34. The suspension characteristic alteration actuators A1R, A1L, A2R and A2L thus start to be driven at the time point t34, and the suspension characteristic is restored from SPORT to SOFT state at a time point t35, when the time interval Ta has elapsed since the time point t 34. The suspension characteristic, as explained above, is hereinafter altered in accordance with the vehicle speed V and the road conditions during the suspension control.

In the first embodiment, the right and left height sensors H1R and H1L, the ECU 4 and the process steps (steps 114, 214, 314, and 414) executed ECU 4 integrally function as the vehicle height detection means M1. The ECU 4 functions as the determination means M2. the suspension characteristic alternation actuators A1R, A1L, A2L, and A2R, the ECU 4 and the process steps (steps 142, 144, 146, 148, 150, 152, 154, 156, 158, 160, 510, 512, 514, 516, 518, 526, 528, 530, 532, and 534) executed by the ECU 4 integrally function as the suspension characteristic alteration means M3. The ECU 4 and the process steps (steps 100–128) executed by the the ECU 4 function as the alteration determining means M4, while the ECU 4 and the process steps (steps 200–226, 300–326, 400–426, 500, 502, 504) function as the restore determination means M5.

The suspension control system explained hereinabove in detail according to the first embodiment has a structure; the front height sensor H1L (or H1R) detects the vehicle height every height detection time interval ts, and if the maximum vehicle height change H1 within the alteration determination time interval T1 becomes greater than or equal to the first reference value HK1, the suspension characteristic is altered to SPORT or to HARD state in response to the vehicle speed V; the maximum height change within the restoring determination time interval is calculated for three consecutive times, and if all of the calculated values H2, H3, and H4 are less than the second reference value HK1, the suspension characteristic is restored to SOFT or SPORT state in response to the vehicle speed V.

Hereinunder are the advantages offered by the suspension control system according to the first embodiment.

One advantage is quick damping of the vibration exerted on the vehicle body, due to the suspension characteristic having been altered to the harder state such as SPORT or HARD in accordance with the vehicle height change within the alteration determination time interval T1.

Another advantage is continuous control for quick damping of the vibration exerted on he vehicle body in case of the continuous rough road, besides the determination thereof. Because in the present embodiment the vehicle height change is detected for three consecutive times within the restoring determination time interval T2, and the suspension characteristic is restored to SOFT or to SPORT in response to the vehicle speed V if the maximum value of the change is less than the second reference value HK2.

A further advantage is the prevention of a hunting between the softer and the harder suspension states, due to the definite difference between the condition for starting and for terminating control. The former is the vibration of a large amplitude and of short cycle time, while the latter is the vibration of small amplitude and long cycle time; the determination time interval T1, in case of the softer suspension characteristic, is set shorter, with the first reference value HK1 set relatively large, 11, whereas in case of the harder suspension characteristic the determination time interval T2 is set longer with the second reference value HK2 set relatively small, 8.

A still further advantage is high reliability and durability of the actuators A1R, A1L, A2R and A2L, according to the above-mentioned effect; less frequent suspension characteristic alteration, resulted from being executed adequately and only if necessary.

Still a further advantage is better control and stability by quick damping of the vibration exerted on the vehicle body during high speed. In the present embodiment the suspension characteristic can be controlled suitably for the vehicle speed V even on the uniform road surface, whether it is smooth or rough, in accordance with the table which defines the suspension characteristic relating to the vehicle speed V.

Still another advantage is the prevention of so-called bottoming or rebounded stopper bumping. The present embodiment damps immediately the resonant vibration by altering the suspension characteristic to the harder state after the quick detection of the fist shock resulted from bump or dip on the road surface, since the alteration determination time interval T1 is set shorter than the restoring determination time interval T2.

Yet a further advantage is due to reliable control and stability as well as improved ride comfort by altering the suspension characteristic to the harder state in case of either continuous rough road running or running with the vibration with a certain cycle.

The second preferred embodiment of the present invention is described hereinunder except the similar contents to the first embodiment; It has the similar construction to that of the first embodiment shown in FIGS. 2-10, and its formulas for calculating a time interval T1, a maximum vehicle height change H1, and a time interval T2 correspond to the formulas (1), (2), and (3) in the first embodiment, respectively.

The time interval T2 represents the vehicle height alteration determination time interval during the determination as to whether the vehicle height is to be altered, while it represents the restoring determination time interval during the determination as to whether both of the suspension characteristic and the vehicle height are to be restored. The formula (4) in the first embodiment for restoring the suspension characteristic is used for altering the vehicle height in the second embodiment.

For altering the vehicle height, a first operation is thus to calculate a maximum vehicle height change H2 within the vehicle height determination time interval T2, from a maximum vehicle height Hh and a minimum vehicle height Hl:

$$H2 = Hh - Hl \quad (4),$$

where, each vehicle height in the formula also represents converted vehicle height corresponding to the detected vehicle height. The vehicle height is altered from NORMAL to HIGH position, if the maximum vehicle height change H2 is greater than or equal to the second reference value HK2 for three consecutive times. According to the present embodiment, the second reference value HK2 is 8 in the converted vehicle height unit.

Once the vehicle height has been altered, if the maximum vehicle height change H2 is less than the second reference value HK2 for three consecutive times the vehicle height is restored from HIGH to NORMAL while the suspension characteristic is restored selectively from SPORT to SOFT state and from HARD to SPORT state.

Another speed responsive mechanism adopted to the second embodiment is explained referring to FIG. 23, which shows a table defining the relation between the vehicle speed V and the vehicle height in both cases of the rough road running and the smooth road running. If the vehicle is determined to be running on the rough road surface, the vehicle height is set as follows; selectively at High and NORMAL in case of HIGH MODE and NORMAL MODE respectively, in response to the vehicle speed V being less than 40 km/h; at HIGH in response to the vehicle speed V being from 40 km/h to 90 km/h; and at NORMAL in response to the vehicle speed V being 90 km/h or above.

On the contrary, if the vehicle is determined to be running on the smooth road surface, the vehicle height is set as follows; selectively at HIGH and NORMAL in case of HIGH MODE and NORMAL MODE respectively, in response to the vehicle speed V being less than 90 km/h; and at LOW in response to the vehicle speed V being 90 km/h or above.

Suspension control process steps executed by the ECU 4 according to the second embodiment are explained hereinunder referring to the flow charts shown in FIGS. 24-27. Process steps 150-179, 100-124, 126-194, 200-216 are shown respectively in FIG. 24, FIG. 25, FIG. 26, and FIG. 27.

Set forth below is the summary of the suspension control process steps according to the second embodiment.

(1) The vehicle height is detected every vehicle height detection time interval ts, the maximum vehicle height change H1 within the suspension characteristic alteration determination time interval T1 is calculated, and it is determined whether the maximum vehicle height change H1 is less than the first reference value HK1 within the time interval T1 (steps 102, 104, 106, 108, 112, 114, 116, 118, and 120).

(2) The suspension characteristic is altered from SOFT to SPORT state, when the maximum vehicle height change H1 within the time interval T1 is determined, according to the process step (1), to be greater than or equal to the first reference value HK1 (steps 124, 126, 128, 130, 132, 134, 136, 138, 140, 142, and 144).

(3) The vehicle height is detected every detection time intervals ts, and the maximum vehicle height change within the vehicle height alteration determination time interval T2 is calculated for three consecutive times, and if none of maximum vehicle height changes $H_{N-1}$, $H_{N-1}$, and $H_N$ is less than the second reference value HK2, the vehicle height is altered from NORMAL to HIGH (steps 104, 106, 108, 110, 150, 152, 154, 156, 158, 160, 162, 164, 172, 180, 182, 184, 186, 190, 192, and 194).

(4) If all of the maximum vehicle height changes H2, H3, and H4 are less than the second reference value HK2, the suspension characteristic is restored from SPORT to SOFT state, while the vehicle height is restored from HIGH to NORMAL (steps 104, 106, 108, 110, 150, 152, 154, 156, 158, 160, 162, 164, 178, 179, 200, 202, 204, 206, 180, 182, 184, 186, 208, 210, 212, 190, and 192).

Hereinunder is a detailed explanation of the suspension control process steps described as above. At step 100, flags F1, F2, F3, and F4, counters C1, C2, and C3, and timers TS, and TD are reset. The flag F1 which represents a target suspension characteristic is set at 1, when SPORT is desired. The flag F2 which represents a target height is set at 1, when HIGH is desired. The flag F3 which represents an actual suspension characteristic is set at 1 in response to SPORT, and reset at 0 in response to SOFT. The flag F4 which represents the condition of the vehicle height adjustment is set at 1, while the adjustment is executed. The counter C1 counts the number of the height data for determining the suspension characteristic alternation, while counters C2 and C3 count the number of the height data for determining the height alternation. The timer TD times an actuator driving time interval, and the timer TS times the vehicle height determination time interval.

The process step is advanced to step 102, where the timer TS starts counting, and the height is detected as hN, which is a converted vehicle height value, every vehicle height detection time interval ts (104, 106, and 108). At the subsequent step 110, the condition of the flag F1 is determined. Since the flag F1 has been already reset at step 100, the process step is advanced to step 112, where the counter C1 is added by one everytime the vehicle height is detected. The above-mentioned process steps 104-114 executed repeatedly till the value of the counter C1 gets equivalent to N1, which is the number of the detected height data for determining the suspension characteristic alteration. The process step is advanced to step 116, where the height is detected every height detection time interval ts as many times as N1, which is the number of the detected height data for determining the height alteration. At further steps beginning with step 116, H1, which is the difference between the maximum and the minimum of the converted vehicle height value, is calculated and compared with the first reference value HK1 (steps 116, 118, and 120).

If the calculated difference H1 is less than than the first reference value HK1, the process step is returned to the above-mentioned step 104. On the other hand, if the above-mentioned difference H1 is greater than or equal to the first reference value HK1, the road surface is determined to have more bumps and dips than a predetermined value. Thus, when the vehicle speed V is Vk1 or above (40 km/h in the present embodiment), the flag F1 is set at such a value that the suspension characteristic is altered to SPORT (steps 122 and 124).

It is verified after determining the condition of the flag F1 that the actual suspension characteristic is not SPORT by the condition of the flag F3, and then the timer TD starting timing, the suspension characteristic alteration actuators A1L, A1R, A2L, and A2R are thereafter energized to alter the suspension characteristic to SPORT (steps 126, 128, 130, 132, and 134). When the actuator driving time interval Tb has elapsed, the suspension characteristic alteration actuators A1L, A1R, A2L, and A2R are deenergized, the flag F3 is set at 1, and the timer TD is reset in response to the suspension characteristic having been altered to SPORT (steps 130, 136, 138, 140, 142, and 144).

The height is detected again every height detection time interval ts consecutively as many times as N2, which is the number of the detected height data for determining the height alteration (steps 104, 106, 108, 110, 150, 152, 160, 126, 128, 180, and 182). $H_N$, which is the difference between maximum and the minimum of the converted vehicle height value, is calculated also for three consecutive times thereafter (step 154). The process step is advanced to steps beginning with step 156, where it is determined whether none of three calculated differences $H_{N-2}$, $H_{N-1}$, and $H_N$ is less than the height alteration determination reference value HK2 (steps 156, 158, 160, 162, 164). If this is the case, the flag F2 is set at such a value that the height is altered from NORMAL to HIGH after the confirmation of the vehicle speed V being VK2 (40 km/h in the present embodiment) or above (steps 170 and 172). Because the vehicle is determined to run on the continuous rough road surface, due to the vibrations on the vehicle body remaining undamped despite of the suspension characteristic altered to SPORT.

If it is verified by the flag F4 that the height has not been adjusted after the ascertaining by both the flag F1 and the flag F3 of the suspension characteristic being altered to SPORT, which satisfys the condition for starting the height adjustment, the process is started for altering the height from NORMAL to HIGH, with the flag F4 set (steps 126, 128, 180, 182, 184, and 186). The compressed air feed and discharge system 10 is energized and the compressed air is transferred to the air suspensions S1L, S1R, S2L, and S2R via air spring feed and discharge valves V1L, V1R, V2L, and V2R respectively. If it is verified that the height gets HIGH according to these steps, which satisfys the condition for terminating the height adjustment, the process is executed for terminating the adjustment, with the flag F4 reset (steps 180, 190, 192, 194).

Furthermore, the vehicle height is detected every vehicle height detection time interval ts, and the difference between the maximum and the minimum vehicle height within the vehicle height alteration determination time interval T2 is calculated for three consecutive times (steps 104, 106, 108, 110, 150, 152, 154, 156, 158, 160, and 162). Either if all of the differences $H_{N-2}$, $H_{N-1}$, $H_N$ are less than the second reference value HK2, or if the vehicle speed V is less than VK3 (25 km/h in the present embodiment), the flag F1 is reset at such a value that the suspension characteristic is restored from SPORT to SOFT, with the flag F2 reset at such a value that the height is altered from HIGH to NORMAL (steps 164, 178, 179, 170, 174, and 176). This is for the purpose of restoring both of the suspension characteristic and the vehicle height suitably for the smooth road running, since the rough road running is determined to come to an end due to the vibration exerted on the vehicle body having been sufficiently damped.

After it is verified by the condition of both the flag F1 and the flag F3 that the actual suspension characteristic is SPORT while SOFT suspension characteristic is desired, the suspension characteristic alteration actuators A1L, A1R, A2L, and A2L are energized to restore the suspension characteristic from SPORT to SOFT (steps 126, 200, 202, 204, 206, 208, 210, 212, 214, and 216). Besides, the height is also restored from HIGH to NORMAL, by the emission from the air suspensions S1L, S2L, and S2R due to the operation of the air spring feed and discharge valves V1L, V1R, V2L, and V2R and the compressed air feed and discharge system 10, since the condition for starting the vehicle height adjustment is satisfied (steps 180, 182, 184, 186, 190, 192, and 194). The process steps according to the present suspension control as explained above are repeatedly executed whenever the vehicle runs on the road surface as long as the auto mode (AUTO) is selected.

Figure 28:
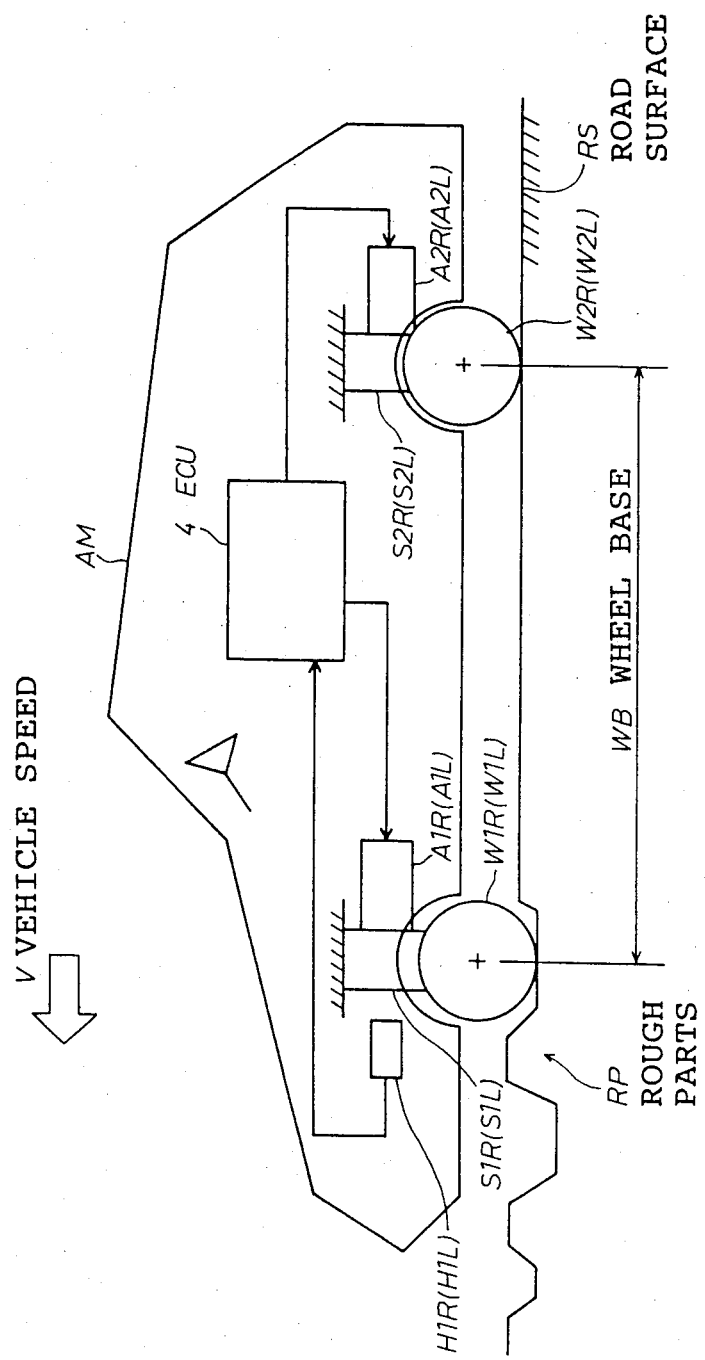
FIG. 28 is a diagram illustrative of a vehicle provided for the suspension control system of the second embodiment dipping in the road surface.

One example of control timing for executing suspension control process steps is explained hereinunder referring to FIGS. 28–29C. FIG. 28 is a schematic view in which a front wheel W1R (or W1L) is about to traverse a rough part RP followed by a continuous rough road when a vehicle AM runs on a road surface RS at speed V km/h.

FIGS. 29A–C are timing charts showing the changes in output from the front height sensors H1L and H1R, driving current from the suspension characteristic alteration actuators A1R, A1L, A2R and A2L, and the desired height in relation to the elapse of time when the vehicle is in the condition shown in FIG. 28.

A time point t2 indicates a time point when the vehicle is in the condition FIG. 28 in which front wheel W1R (or W1L) thereof is about to traverse the rough part RP. The maximum vehicle height change H1 during the time interval T1 between the time point t2 and a time point t3 detected from the height sensor H1L (or H1R) becomes greater than the first reference value HK1, as shown in FIGS. 29A–C. Among the vehicle height data detected every detection time interval ts, the converted vehicle heights of the maximum and the minimum vehicle height respectively take values 22 and 9 in this case, thus the maximum vehicle height change H1 takes a value 13 which is greater than the second reference vehicle HK1 11 in amount. Therefore, at the very same time point T2 the suspension characteristic alteration actuators A1R, A1L, A2R and A2L are electrified, which is continued till a time point t4, at which the suspension characteristic alteration time interval Ta has elapsed since a time point t3. At the time point t3 the suspension characteristic is altered from SOFT to SPORT state. On the other hand, since the suspension characteristic is altered to SPORT state at the time point t3, the vibration exerted on the vehicle body is sufficiently damped and the output from the front height sensors H1L and H1R is ceased in the manner as indicated by the solid line in FIG. 29A. Unless the suspension characteristic is altered, output from the front height sensors H1L and H1R is not easily ceased as indicated by the broken line shown also in FIG. 29A.

During a height alteration determination time interval T2 between the time point t2 and the time point t5, the converted vehicle heights of the maximum and the minimum vehicle height respectively take values 21 and 10, thus the maximum vehicle height change H2 takes value 11 which is greater than the second reference value HK2 of 8. During another height alteration determination time interval T2 between the time point t5 and the time point t6, the converted vehicle heights of the maximum vehicle height and the minimum vehicle height respectively take values 21 and 9, thus the maximum vehicle height change H2 takes value 12 which is greater than the second reference value HK2 of 8. During a third height alteration determination time interval T2 between the time point t6 and a time point t7, the converted vehicle heights of the maximum vehicle height and the minimum vehicle height respectively take values 19 and 10, thus the maximum vehicle height change H2 takes value 9 which is not less than the second reference value HK2 of 8. Accordingly, the vehicle is determined to be running on the continuous rough road, with the vibration exerted on the vehicle body remaining undamped at the time point t7. The height alteration actuators A1R, A1L, A2R and A2L are electrified, with a compressed air feed and discharge system 10 driven at a time point t8, at which a predetermined time interval Tc has elapsed since the time point t7. At a time point t9, at which the completion time interval Ta has elapsed since the time point t8, the desired height is altered from NORMAL to HIGH, which is resulted from compressed air having been transferred to the air suspensions S1L, S1R, S2L, and S2R. Electrifying the height alteration actuators is terminated at the time point t9.

The vehicle AM continues running on the rough road, which is detected as described hereinabove, with the suspension characteristic having been altered to SPORT and the vehicle height to HIGH. Even during this running the vehicle height is detected consecutively. During the vehicle height alteration determination time interval T2 between a time point t10 and a time point t11, the converted vehicle heights of the maximum and the minimum vehicle height respectively take values 20 and 13, thus the maximum vehicle height change H2 takes value 7 which is less than the second reference value HK2 of 8. During another height alteration determination time interval T2 between the time point t11 and a time point t12, the converted vehicle heights of the maximum and the minimum vehicle height respectively take values 20 and 13, thus the maximum vehicle height change H2 takes value 7 which is less than the second reference value HK2 of 8. During a third height alteration determination time interval T2 between the time point t12 and a time point t13, the converted vehicle heights of the maximum and the minimum vehicle height respectively take values 19 and 14, thus the maximum vehicle height change H2 takes value 5 which is also less than the second reference value HK2 of 8. Accordingly, the vehicle is determined not to be running on the continuous rough road any more, with the vibration exerted on the vehicle body having been sufficiently damped at the time point t13. Electrifying the suspension characteristic alteration actuators A1R, A1L, A2R and A2L is started at the time point t13, which is continued till a time point 15, at which the actuator driving time interval Tb has elapsed, and the suspension characteristic is restored from SPORT to SOFT at a time point t14, at which a suspension characteristic alteration time interval Ta has elapsed. At a time point t16, at which a predetermined time interval Td during the height adjustment condition being satisfied has elapsed since the time point t13, the height alteration actuators are electrified, with a compressed air feed and discharge system 10 driven. At a time point t17, at which a predetermined time interval has elapsed since the time point 16, the desired height is restored from HIGH to NORMAL as a result of the emission from the air suspensions S1L, S1R, S2L, and S2R. Electrifying the height alteration actuators is terminated at the time point t17.

The suspension control is executed repeatedly which is operative to alter the suspension characteristic in response to the detection of the sporadic bump or dip, to alter the vehicle height in response to the determination of the continuous rough road subsequent thereto, and to restore both the suspension characteristic and the height in response to the determination of the shift to the smooth road running thereafter.

In the second embodiment, the right and left height sensor H1R and H1L, the ECU 4 and the process step (step 108) executed by the ECU 4 integrally function as the vehicle height detection means M1. The ECU 4 and the process steps (steps 112, 114, 116, 118, and 120) executed by the ECU 4 integrally function as the suspension characteristic determination means M2. The ECU 4 and the process steps (steps 150, 152, 154, 156, 158, 160, 162, and 164) executed by the ECU 4 integrally function as the vehicle height alteration means M3. The air suspensions S1L, S1R, S2L, and S2R, the suspension characteristic alternation actuators A1L, A2L, and A2R, the ECU 4 and the process steps (steps 130, 132, 134, 136, 138, 140, 142, 144, 202, 204, 206, 208, 210, 212, 214, and 216) executed by the the ECU 4 function as the suspension characteristic alteration determining means M4, while the air suspension S1L, S1R, S2L, S2R, and air spring feed and discharge valves V1L, V1R, V2L, V2R, the compressed air feed and discharge system 10, the ECU 4 and the process steps (steps 180, 182, 184, 186, 190, 192, and 194) function as the restoring determination means M5.

The suspension control system explained hereinabove in detail according to the second embodiment has a structure; if the maximum vehicle height change H1 within the alteration determination time interval T1 becomes greater than or equal to the first reference value HK1, the suspension characteristic is altered from SOFT to SPORT state; the maximum height change within the vehicle height alteration determining time interval T2 is calculated for three consecutive times and if none of the calculated values H2, H3, and H4 is less than the second reference value HK2, the vehicle height is altered from NORMAL to HIGH position; the maximum vehicle height change within the vehicle height alteration determining time interval T2 is again calculated for three consecutive times, and if all of the calculated values H5, H6, and H7 are less than the second reference value HK2, both the suspension characteristic and the vehicle height are altered to SOFT and to NORMAL, respectively.

Hereinunder are the advantages offered by the suspension control system according to the second embodiment.

One advantage of is the operation in both case of the continuous rough road and the vibration exerted on the vehicle body due to the sporadic bump or dip on the road surface; in the former case, the present embodiment improves ride comfort, preventing the bottoming or the like by altering the vehicle body to the higher state, and keeps the base of the vehicle body off the road surface; in the latter case, the present embodiment ensures control and stability, damping the vibration by altering the suspension characteristic to the harder state.

Another advantage is the accurate detection of the continuous rough road, due to the adequate determination of the vibration after the suspension characteristic alteration. The vehicle height determination time interval T2 is set at a longer value while the vehicle height determination reference value HK2 is set at a less value. Since the cycle of the vibration is expected to get longer in response to the amplitude getting smaller, after the vibration is controlled due to the suspension characteristic having been altered to the harder state.

A further advantage is better durability as well as reliability of air spring feed and discharge valves V1L, V1R, V2L, and V2R, and the compressed air feed and discharge system 10, all of which are operative to alter the vehicle height. In the present embodiment, the frequency of the vehicle height alteration, which is executed after the detection of the continuous rough road, is decreased.

A still further advantage is the stability of the vehicle position by avoiding the vehicle body rolling which in particular follows a high speed running. The vehicle height is altered not in response to the sporadic bump or dip, but in response to the change in the road surface condition; when the continuous rough road is detected, it is altered to HIGH, whereas it is restored to NORMAL when the road surface condition turns smooth.

Still a further advantahge is the prevention of hunting according to the suspension characteristic alteration control. Since there is the definite difference between the condition for starting and that for terminating the suspension characteristic alteration.

Still another advantage is improved ride comfort by preventing so-called bottoming or rebounded stopper bumping. When the smooth road surface condition turns rough, the present embodiment damps immediately the resonant vibration by detecting quickly the first shock resulted from the sporadic bump or dip on the road surface and altering the suspension characteristic to the harder state thereafter. Since the alteration determination time interval T1 is set at a shorter value than the restoring determination time interval T2.

Yet another advantage is better control and stability during high speed. In the present embodiment both of the vehicle height and the suspension characteristic can be controlled suitably for the vehicle speed V even on the road of uniform condition, whether it is smooth or rough, in accordance with the table which defines the suspension characteristic relating to the vehicle speed V.

Embodiment of suspension characteristic alteration means other than air suspensions or shock absorbers are described below.

Figure 30A:
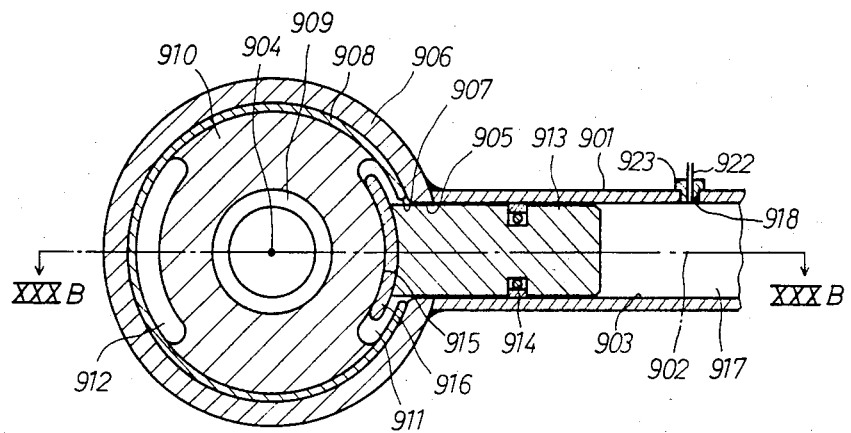
FIG. 30A is a longitudinal cross-section of a rubber bush as a first embodiment of unit.
Figure 30B:
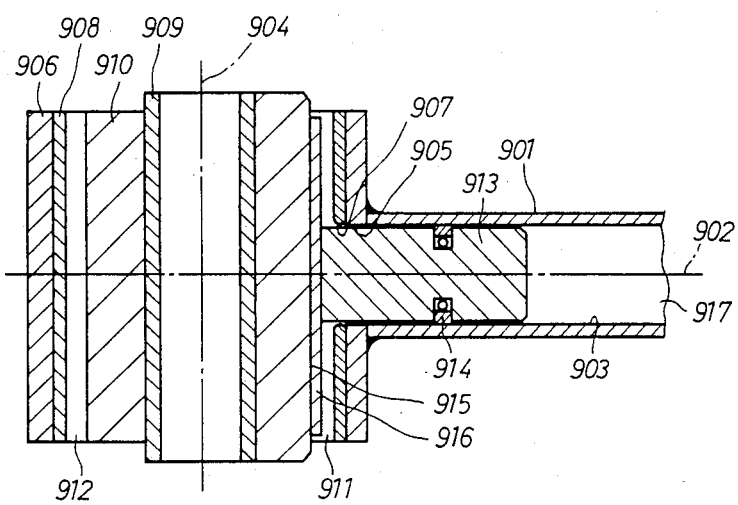
FIG. 30B is a cross-sectional view of the first embodiment taken on line XXXB—XXXB.

The first embodiment is bush for a joint of a suspension bar such as the upper and lower control arms of a suspension, as shown in FIGS. 30A and 30B. The bush is provided with a mechanism for changing the stiffness of the bush to alter the characteristic of a suspension. The changing of the stiffness means changing of spring constant or damping force of the bush.

FIG. 30A shows a longitudinal sectional view of the joint of the suspension bar. FIG. 30B shows a sectional view taken on line XXXB—XXXB shown in FIG. 30A. A control arm 901 extending along an axis 904 perpendicular to the axis 902. A sleeve 906 which has a hole 905 is welded around the hole at one end of the control arm 901. An outer cylinder 908 having a hole 907 is press-fitted in the sleeve 906. An inner cylinder 909 is provided in the outer cylinder 908 concentrically thereto. The bush 910 made of vibration-proof rubber is interposed between the outer cylinder 908 and the inner cylinder 909. The bush 910 and the outer cylinder 908 define openings 911 and 912 which are located in the face of each other along the axis 902 and extend as arcs around the axis 904, so that the stiffness in the direction of the axis 902 is set at a relatively low value.

The hole 903 of the control arm 901 constitutes a cylinder which supports piston 913 for movement back and forth along the axis 902. A sealing member 914 is tightly packed in between the piston 913 and the inside surface of the hole 903. A contact plate 916 is secured at one end of the piston 913. The contact plate 916 curves about the axis 904 and extends along the axis so that the plate is brought into contact with the inside surface 915 of the opening 911.

The same construction as shown in FIGS. 30A and 30B is provided at the other end of the control arm 901. A cylinder chamber 917 is defined between the piston 913 and another piston (not shown) and fitted with the other end of the control arm 901. The cylinder chamber 917 connects with the exterior through a tapped hole 918 provided in the control arm 901. A nipple 923 secured on one end 922 of a conduit connected to an oil pressure source not shown in the drawings is secured in the tapped hole 918 to apply oil pressure to the cylinder chamber 917. When the oil pressure in the cylinder chamber 917 is relatively low, the force pushing the piston 913 (leftward in the drawings) is so weak and the piston is held in such a position shown in the drawings that the contact plate 916 is brought into light contact with the inner surface 915 of the bush 910. As a result, the stiffness of the bush 910 in the direction of the axis 902 is made relatively low.

When the oil pressure in the cylinder chamber 917 is relatively high, the piston 913 is driven (leftward in the drawings) and the contact plate 916 pushes the inner surface 915 of the bush 910 so that the portion of the bush between the contact plate and the inner cylinder 909 is compressed. As a result, the stiffness of the bush 910 in the direction of the axis 902 is raised.

If the suspension bar is provided between the body and rear wheel of a vehicle, the characteristic of the suspension for the rear wheel can be altered by regulating the oil pressure in the cylinder chamber 917 through the action of an actuator such as a pressure control valve. When the oil pressure is heightened by an instruction from an ECU 4, the stiffness of the bush 910 is enhanced to increase the damping force and spring constant of the suspension to improve the control and the stability of the vehicle. When the oil pressure is lowered, the damping for the rear portion of the vehicle is reduced.

Figure 31A:
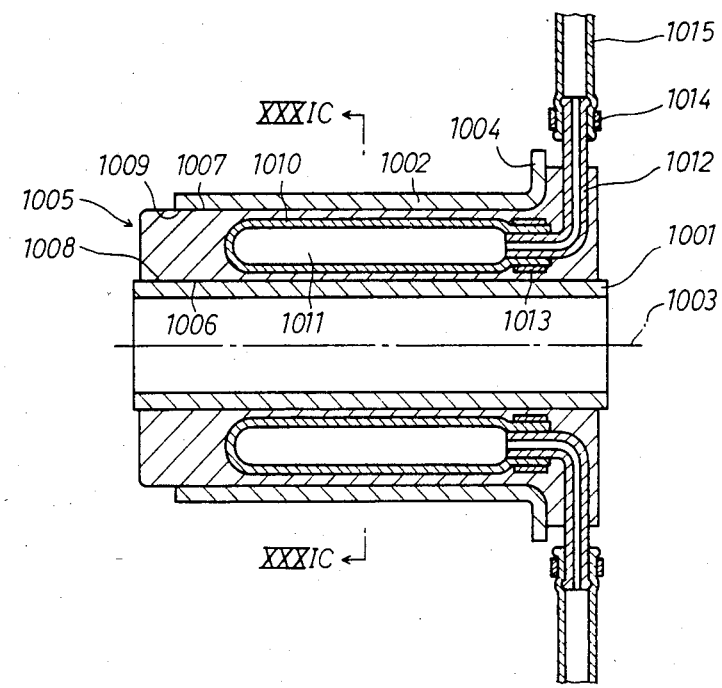
FIG. 31A is a cross-sectional view of another rubber bush as a second embodiment of unit.
Figure 31B:
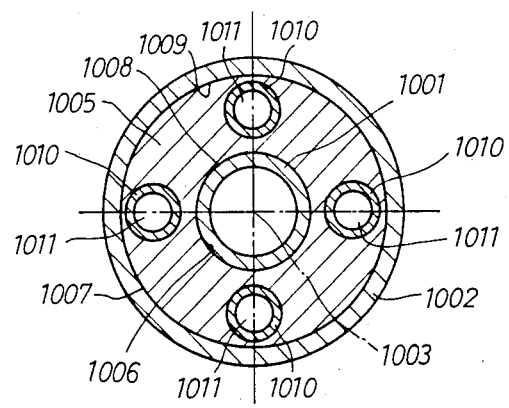
FIG. 31B is a cross-sectional view of the second embodiment taken on line XXXIC—XXXIC.

The second embodiment is another bush shown in FIGS. 31A and 31B and having the same function as the former. FIG. 31A shows a longitudinal sectional view of the bush constructed together with inner and outer cylinders as a bush assembly. FIG. 31B shows a sectional view taken on line XXXIC—XXXIC shown in FIG. 31A. Four expansible and compressible dip bags 1010, which extend along an axis 1003 and are separately located in equiangular positions around the axis, are embedded in the bush 1005, and define four chambers 1011 extending along the axis 1003 and separately located in equiangular positions around the axis.

Each dip bag 1010 is secured at one end on one end of a coupler 1012 embedded in the bush 1005 by a clamp 1013, so that the chamber 1011 connects with the exterior of the bush through the coupler 1012. One end of a hose 1015 is fixedly connected with the other end of the coupler 1012 by clamp 1014, and the other end of the hose 1015 is connected with a compressed air source through an actuator such as a pressure control valve (not shown), so that controlled air pressure can be introduced into each chamber 1011. When the actuator is put in operation by an ECU 4.

The air pressure in each chamber 1011 can be varied to change the stiffness of the bush in a stepless manner. The stiffness of the bush can thus be appropriately changed to be high (hard) or low (soft) after a shock at the front wheel of a vehicle is detected.

Figure 32:
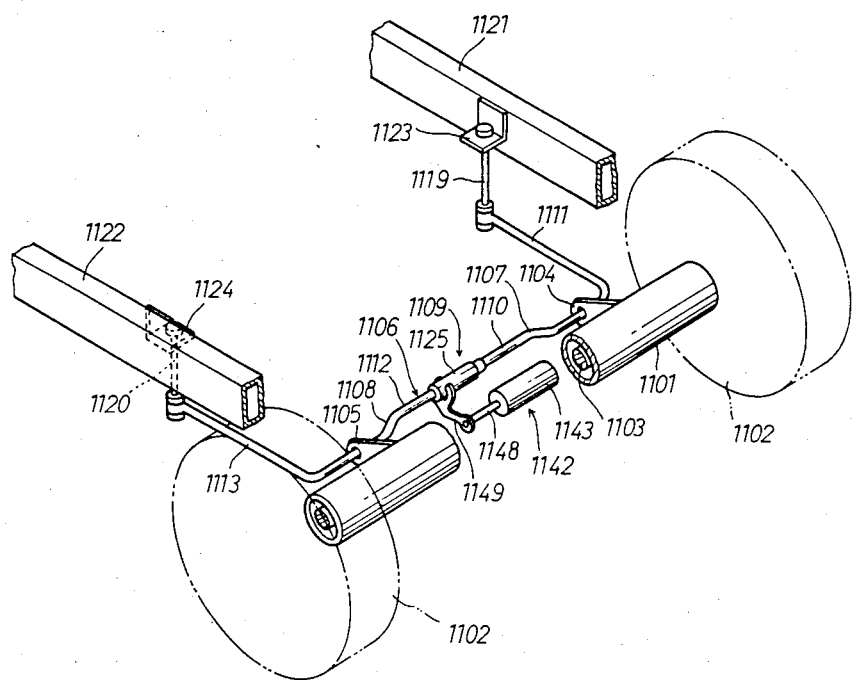
FIG. 32A is a perspective view of a stabilizer as a third embodiment in use.
FIGS. 32B-32C are partially enlarged cross-sectional views showing two different parts of the third embodiment.
FIG. 32D is a perspective view showing main parts of the third embodiment.
FIG. 32E is a plan view thereof.
FIG. 32F is a cross-sectional view of FIG. 32B taken on line XXXF—XXXF.
FIG. 32G is a cross-sectional view of FIG. 32B taken on line XXXG—XXXG.
Figure 32B:
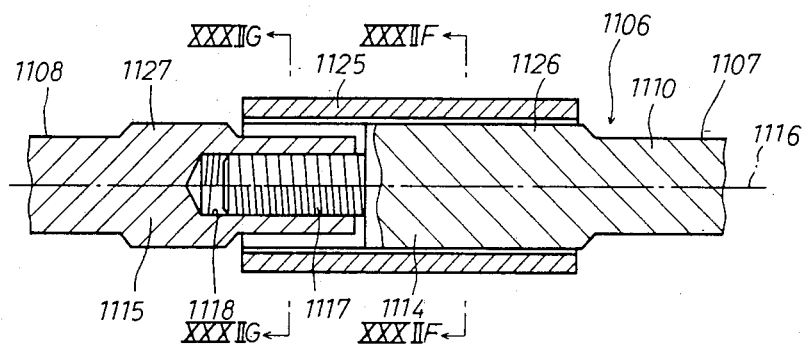
Figure 32:
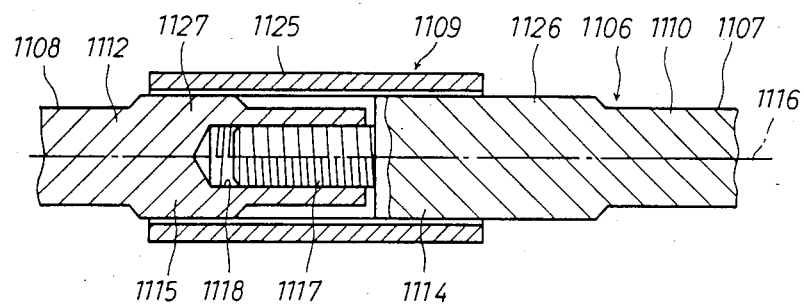
Figure 32:
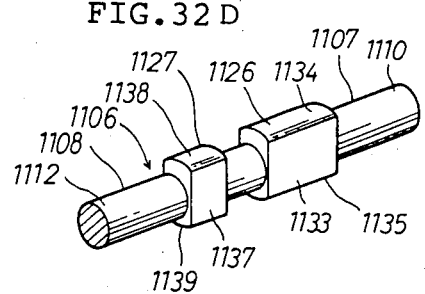
Figure 32:
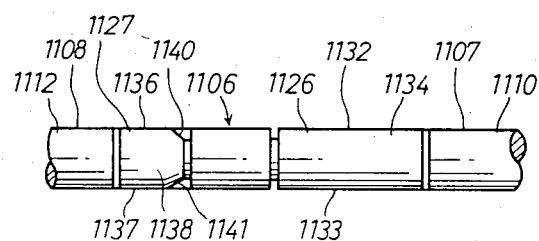
Figure 32:
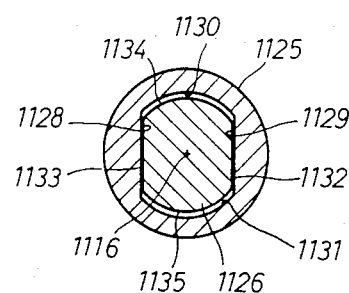
Figure 32:
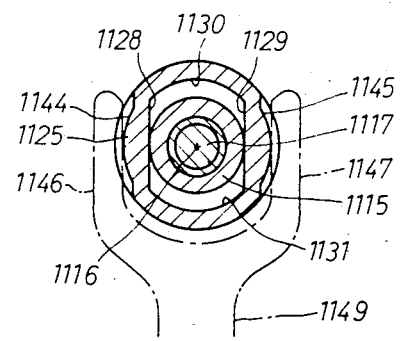

FIGS. 32A–32G show a construction of a stabilizer as the third embodiment. FIG. 32A shows a exploded oblique view of the torsion-bar-type stabilizer built in the axle-type rear suspension of an automobile. FIGS. 32B and 32C show enlarged partial longitudinal sectional views of the main part of the stabilizer in the coupled and uncoupled states thereof. FIGS. 32D shows an oblique view of the main part shown in FIGS. 32B and 32C and removed from a clutch. FIG. 32E shows a plan view of the main part shown in FIG. 32D. FIG. 32F shows a sectional view taken on line XXXF—XXXF shown in FIG. 32B. FIG. 32G shows a sectional view taken on line XXXG—XXXG shown in FIG. 32B. An axle 1103 coupled with wheels 1102 is rotatably supported by an axle housing 1101. A pair of brackets 1104 and 1105 are secured on the axle housing 1101, in positions separated from each other in the direction of the width of the automobile. The torsion-bar-type stabilizer 1106 is coupled to bushes (not shown). The stabilizer 1106 includes a right portion 1107 and the left portion 1108 can be selectively coupled to each other integrally by a coupling unit 1109. A protrusion 1117 and a hole 1118, which extend along an axis 1116, are formed at the ends 1114 and 1115 of rods 1110 and 1112 opposite arms 1111 and 1113, and are provided with a male screw and a female screw which are engaged with each other to couple the rods 1110 and 1112 rotatably relative to each other around the axis 1116. The tips of the arms 1111 and 1113 are coupled to brackets 1123 and 1124 secured on the side frames 1121 and 1122 of the vehicle by links 1119 and 1120. The coupling unit 1109 includes the cylindrical clutch 1125, a clutch guide 1126 which is provided at one end 1114 of the rod 1110 and supports the clutch 1125 non-rotatably relative to the guide around the axis 1116 for movement back and forth along the axis, and a clutch bearer 1127 which is provided at the end 1115 of the rod 1112 and non-rotatably bears the clutch 1125 relative to the bearer around the axis 1116.

The inside circumferential surface of the clutch 1125 includes planes 1128 and 1129 facing each other relative to the axis 1116 and extending in parallel with each other along the axis, and partially cylindrical surfaces 1130 and 1131 adjoining the planes in positions opposed to each other relative to the axis 1116, as shown in FIGS. 32F and 32G. Corresponding to the inside circumferential surface of the clutch 1125, the peripheral surface of the clutch guide 1126 includes planes 1132 and 1133 facing each other on opposite sides of the axis 1116 and extending in parallel with each other, and partially cylindrical surfaces 1134 and 1135 adjoining the planes in position opposed to each other relative to axis 1116. The peripheral surface of the clutch bearer 1127 includes planes 1136 and 1137 facing each other relative to the axis 1116 and extending in parallel with each other along the axis, and partially cylindrical surfaces 1138 and 1139 adjoining the planes in position opposed to each other relative to the axis 1116.

When the planes 1132 and 1133 of the clutch 1126 are engaged with those 1128 and 1129 of the clutch 1125, as shown in FIG. 32C, the right portion 1107 and left portion 1108 of the stabilizer are integrally coupled to each other nonrotatably relative to each other around the axis 1116. The ends of the planes 1136 and 1137 of the clutch bearer 1127 at the right portion 1107 of the stabilizer are chamfered at 1140 and 1141 so that even if the rods 1110 and 1112 are slightly rotated relative to each other around the axis 1116, the clutch 1125 can be moved from a position shown in FIG. 32B to a position shown in FIG. 32C, to couple the right portion 1107 and left portion 1108 of the stabilizer integrally to each other as the arms 1111 and 1113 of the portions are on the same plane.

The clutch 1125 is moved back and forth along the axis 1116 by an actuator 1142 regulated by an ECU 4. The actuator 1142 includes a hydraulic piston-cylinder unit 1143 secured on a differential casing (not shown), and a shifting fork 1149 which includes arms 1146 and 1147 engaged in the grooves 1144 and 1145 of the peripheral surface of the clutch 1225, as shown in FIG. 32G, and is coupled to the piston rod 1148 of the piston-cylinder unit 1143.

When the clutch 1125 is placed in a position shown in FIG. 32C, by the actuator 1142 according to an instruction from the ECU 4, the right portion 1107 and left portion 1108 of the stabilizer 1016 are integrally coupled to each other to put the stabilizer in such a state that can fulfill its function to reduce the rolling of the vehicle to improve its control and stability. When the clutch 1125 is placed in a position shown in FIG. 32B, by the actuator 1142, the right portion 1107 and left portion 1108 of the stabilizer 1016 can be rotated relatively to each other around the axis 1116 to reduce the shock on the vehicle, particularly the shock on its wheels on only one side of the vehicle, or improve the ride comfort of the vehicle.

Figure 33:
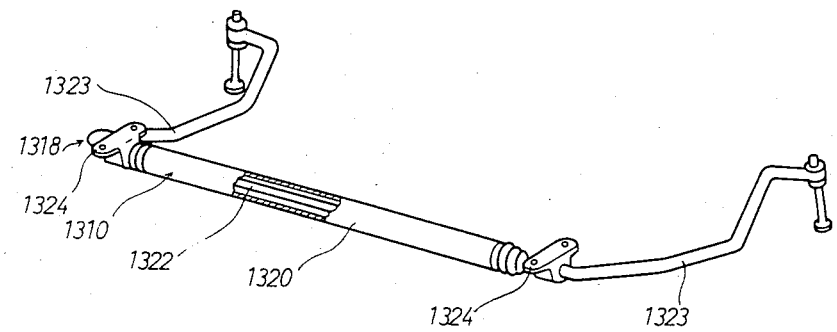
FIG. 33A is a perspective view of another stabilizer as a fourth embodiment.
FIG. 33B is a partially enlarged cross-sectional view of FIG. 33A.
Figure 33:
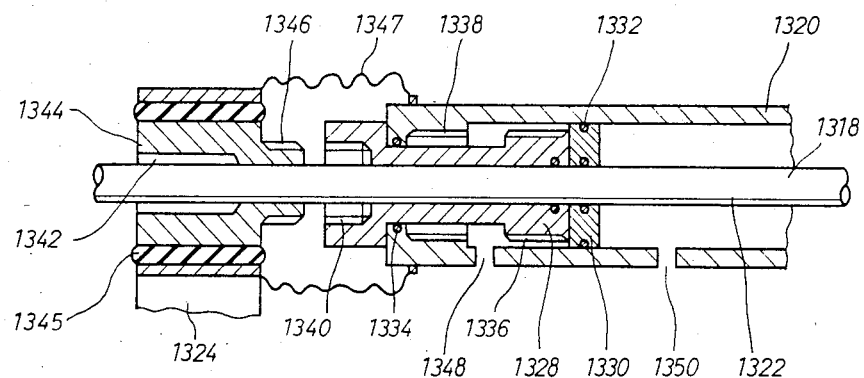

FIGS. 33A and 33B show another stabilizer as the fourth embodiment. A stabilizer-bar-type assembly 1310 includes a first stabilizer bar 1318 and a second stabilizer bar 1320, as shown in FIG. 33A. The first stabilizer bar 1318 includes a main portion 1322 and an arm 1323. The main portion 1322 is attached to the body of a vehicle by a pair of fitting brackets 1325 so that the main portion 1322 can be twisted around its axis. The second stabilizer bar 1320 is dip so that the main portion 1322 of the first stabilizer bar 1318 extends through the second stabilizer bar, as shown in FIG. 33B. The second stabilizer bar 1232 is disposed inside the pair of fitting metals 1324 so that the first stabilizer bar 1318 can be connected to and disconnected from the second stabilizer. A piston 1330 on which a spool 1328 is secured is slidably disposed inside one end of the second stabilizer bar 1320 in such a manner that the piston is fluid-tight sealed by a sealing member 1332. The spool 1328 is fluid-tightly sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end of the spool.

A coupler 1344 is connected with the main portion 1322 of the first stabilizer bar 1318 by splines 1342. Splines 1346, which can be engaged with the splines 1340, are provided on the coupler 1344 at the end opposed to the spool 1328. The coupler 1344 is connected with a mounting bracket 1324 through a rubber bush 1345, as shown in FIG. 33B, so that the main portion 1322 of the first stabilizer bar 1318 is twisted by deforming the coupler 1344 is fitted in such a position that the splines 1340 are engaged with the splines 1346 when the spool 1328 is moved (leftward in the drawings) and the splines 1336 are engaged with the splines 1338. A bellowslike boot 1347 for protecting the splines 1340 and 1346 from dust is provided between the coupler 1344 and the second stabilizer bar 1320. Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 through an actuator such as pressure control valve, the piston 1330 is moved (leftward in to the drawings), together with the spool 1328, the splines 1336 are engaged with the splines 1338, and the splines 1340 are engaged with the splines 1346. As a result, the first and the second stabilizer bars 1318 and 1320 are coupled to each other so that the stiffness of the stabilizer bar assembly is heightened. When the pressure fluid is led to the other port 1348, the piston 1330 is moved rightward and the splines are disengaged from each other. As a result, the stiffness of the stabilizer bar assembly is constituted by only that of the first stabilizer bar 1318.

Figure 34:
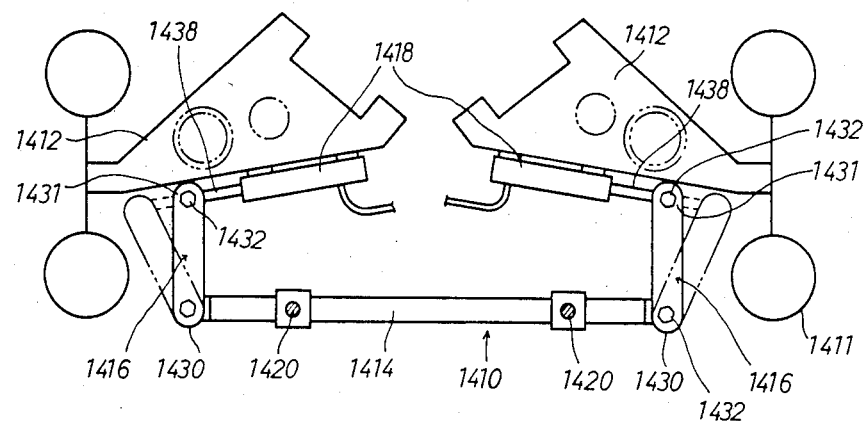
FIG. 34A is a schematic plan view of another stabilizer as a fifth embodiment.
FIG. 34B is an explanatory view showing the structure of one part shown in FIG. 34A.
FIG. 34C is a cross-sectional view of an extending part.
Figure 34:
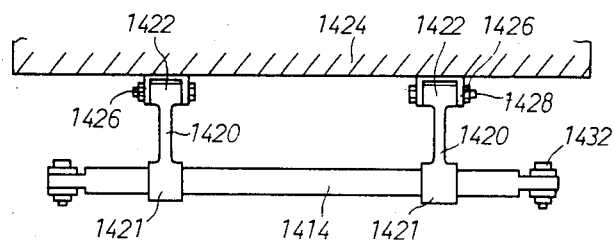
Figure 34:
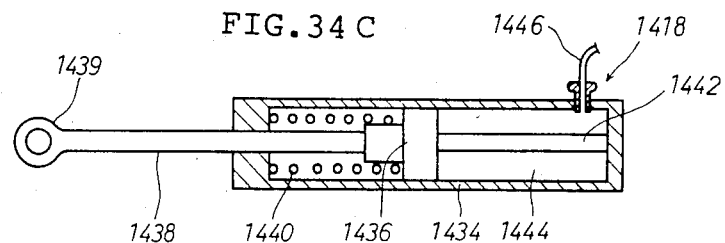

FIGS. 34A, 34B and 18C show still another stabilizer as the fifth embodiment. FIG. 34A shows a plan view of the outline of the stabilizer 1410. Wheels 1411 and suspension arms 1412 are also shown in FIG. 34A. A main part 1414, a pair of arms 1416, and elongation means 1418 are provided. The main part 1414 in the form of a round bar is laid through the bearing porions 1421 of a pair of links 1420 disposed at apart from each other in the direction of the width of the body 1424 of a vehicle, and is supported by the bearing portions 1421 so that the main part 1414 can be twisted around its axis. The other bearing portions 1422 of the links 1420 at the upper ends are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first ends 1430 of the arms 1416 are coupled to the ends of the main part 1414 by blots and nuts 1432 so that the arms can be turned about vertical axes.

The second ends 1431 of the arms 1416 are located at a distance from the first ends 1430 in the front-to-rear direction of the vehicle body 1424. The front-to-rear direction includes an oblique longitudinal direction. The second ends 1431 of the arms 1416 are displaced in the direction of the width of the vehicle body 1424 by the elongation means 1418 made of power cylinders. Each of the power cylinders includes a cylinder 1434, a piston 1436 fluid-tight and slidably fitted in the cylinder 1434, a piston rod 1438 coupled at one end to the piston 1416 and projecting at the other end out of the cylinder 1434, and a included spring 1440 for displacing the piston 1436 in such a direction as to retract the piston rod 1438. A stopper 1442 secured on the piston 1436 prevents the piston from being displaced more than a predetermined quantity.

The cylinder 1434 is secured on the suspension arm 1412 in such a manner that the piston rod 1438 is located more outside than the cylinder 1434 in the direction of the width of the vehicle body. The second end 1431 of the arm 1416 is coupled to the outwardly projecting end of the piston rod 1438 by a bolt and nut 1432 so that the arm 1416 can be turned about the vertical axis.

One end of a flexible hose 1446 is connected with the fluid chamber 1444 of the cylinder 1434 opposite the side on which the included spring 1440 is located. The other end of the flexible hose 1446 is connected with a pressure generator (not shown) through an actuator such as a pressure control valve. Unless pressure is applied to the fluid chambers 1444 of the power cylinders according to the state of the actuator corresponding to an instruction from an ECU 4, the second end 1431 of the arms 1416 are located in inner positions as shown in FIG. 34A, so that the anti-roll rate of the stabilizer is low.

When the actuator is operated to apply pressure to the fluid chambers 1444 of the power cylinders, the pressure acts to the pistons 1436 to push out the piston rods 1438 against the compressed springs 1440. As a result, the second ends 1431 of the arms 1416 are pushed out as shown by imaginary lines, i.e. double dotted chain lines, in FIG. 34A, to increase the arm ratio of the stabilizer to heighten its stiffness against the rolling of the vehicle.

Figure 35:
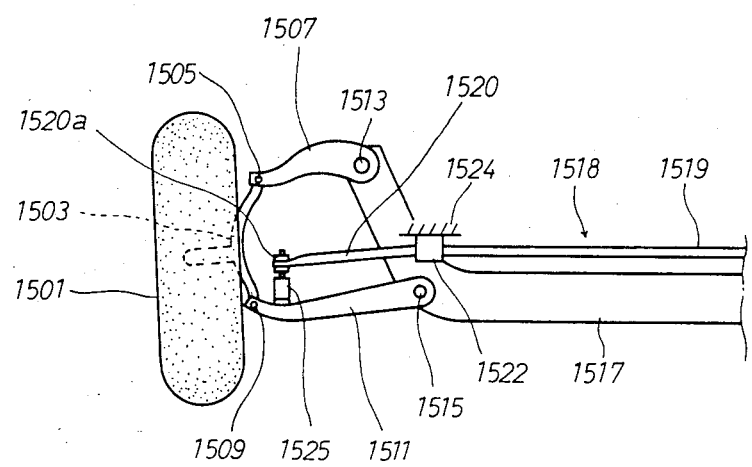
FIG. 35A is a plan view of one part of a stabilizer and a joint as a sixth embodiment in use.
FIG. 35B is a partially enlarged sectional view of the coupling unit shown in FIG. 35A.
Figure 35B:
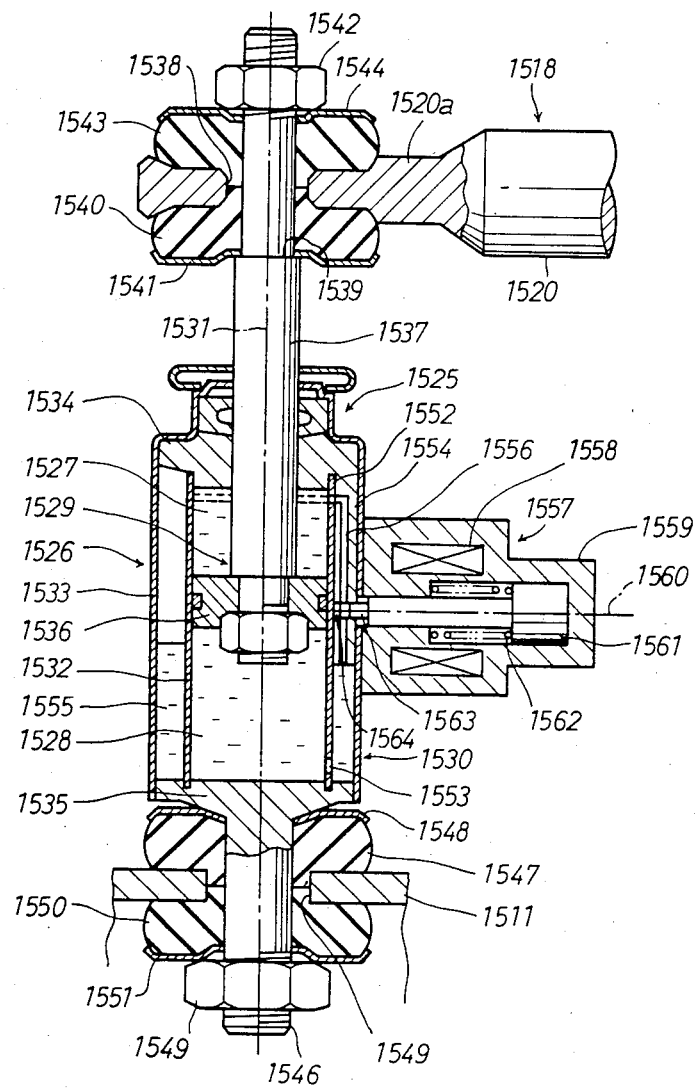

FIGS. 35A and 35B show a construction of a coupling unit for a stabilizer and a lower control arm, as the sixth embodiment. FIG. 34A shows a partial front view of a wishbone-type suspension including the coupling unit for the stabilizer for a vehicle. FIG. 34B shows an enlarged sectional view of the coupling unit shown in FIG. 34A. A wheel 1501 is rotatably supported by a knuckle 1503. The knuckle 1503 is pivotally coupled at the upper one to one end of an upper control arm 1507 by a pivot 1505, and pivotally coupled at the other end to one end of the lower control arm 1511 by a pivot 1509. The upper control arm 1507 and the lower control arm 1511 are pivotally coupled to the cross member 1517 of the vehicle by pivots 1513 and 1515. The stabilizer 1518, which is shaped as a U, is disposed along the width of the vehicle. The stabilizer 1518 is coupled at its central rod 1519 to the body 1524 of the vehicle by brackets 1522 with rubber bushes (not shown) so that the stabilizer can be turned about its axis. The tip 1520a of the arm 1520 of the stabilizer 1518 are coupled to a point near one end of the lower control arm 1511 by the coupling unit 1525. The coupling unit 1525 includes a piston-cylinder assembly 1526 composed of a piston 1529 and a cylinder 1530 which define two cylinder chambers 1527 and 1528. The cylinder 1530 includes an inner cylinder 1532 which supports the piston 1529 for movement back and forth along an axis 1531, and outer cylinder 1533 disposed substantially concentrically to the inner cylinder 1532, and end caps 1534 and 1535 which close both the ends of the inner cylinder and the outer cylinder. The piston 1529 includes a main portion 1536, and a piston rod 1537 which bears the main portion 1536 at one end of the piston rod and extends along the axis 1131 through the end cap 1534 and the hole 1538 of the tip of the arm 1520 of the stabilizer 1518.

A rubber bush 1540 and a retainer 1541 for holding the bush are interposed between the shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is provided with through holes 1552 and 1553 near the end caps 1534 and 1535. The end cap 1534 is integrally provided with a projection 1554 extending along the axis 1531 between the inner cylinder 1532 and the outer cylinder 1533 and is located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 and the other through hole 1553 constitute a passage means for connecting both the cylinder chambers 1527 and 1528 to each other. A portion of the annular space 1555 is filled with air. Portions of the cylinder chambers 1527 and 1528, the internal passage 1556 and the annular 1555 are filled with oil. The change in the volume of the piston rod 1537 in the cylinder 1530, which is caused by the displacement of the piston 1529 relative to the cylinder, is compensated by the compression or expansion of the air filled in the portion of the annular space 1555.

The connection of the internal passage 1556 is selectively controlled by normally-opened solenoid valve 1557. The solenoid valve 1557 includes a housing 1559 containing a solenoid 1558 and secured at one end on the outer cylinder 1533, a core 1561 supported in the housing 1559 for movement back and forth along an axis 1560, and a compressed helical spring 1562 which urges the core 1561 rightward as to FIG. 35B. A valve element 1563 is integrally provided at one end of the core 1561 so that the valve element is selectively fitted into a hole 1564 extending in the projection 1554 across the internal passage 1556.

When no electricity is applied to the solenoid 1558 according to an instruction from an ECU 4, the core 1561 is urged rightward as to the drawing by the compressed helical spring 1562 to open the valve 1557 to allow the connection of the internal passage 1556. When electricity is applied to the solenoid 1558 according to an instruction from the ECU 4, the core 1561 is driven (leftward in the drawings), against the force of the compressed helical spring 1562, to fit the valve element 1563 into the hole 1564 to shut the internal passage 1556. At that time, the cylinder chambers 1527 and 1528 are disconnected from each other, and the oil in the cylinder chambers is kept from flowing to the opposite cylinder chambers, so that the piston 1529 is hindered from moving relatively to the cylinder 1530 along the axis 1531. As a result, the stabilizer 1518 is put in such a state that it can fulfill its function to suppress the rolling of the vehicle to improve the control and stability of the vehicle as its wheel on one side moves up on a bump in a road surface for the vehicle and down into a dip in a road surface.

When no electricity is applied to the solenoid 1558, the solenoid valve 1557 is maintained in an open position shown in FIG. 35B, so that the oil in both the cylinder chambers 1527 and 1528 can freely flow to the opposite cylinder chambers through the internal passage 1556 and so forth. As a result, the piston 1529 can freely move relative to the cylinder 1530 so that the tips of both the right and left arms 1520 can freely move relative to the corresponding lower control arms 1511. For that reason, the stabilizer does not fulfill its function, so that the damping function each rear wheel of the vehicle is reduced to keep good ride comfort.

While the preferred embodiment of the invention has been described, it is to be understood that the invention is not limited thereto, and may be otherwise embodied within the scope of the following claims.

What is claimed is:

1. A suspension control system comprising;
   vehicle height detection means for providing a vehicle height signal representative of a vehicle height;
   suspension characteristic alternation determination means for providing a vehicle height data signal responsive to said vehicle height signal and for providing a first determination signal representative of a suspension characteristic alteration if a difference between a maximum and and minimum value of said vehicle height data signal within a first time interval exceeds a first value thereof;
   suspension characteristic alteration means responsive to said alteration determination means for altering said suspension characteristic;
   suspension characteristic restoring determination means for providing a second determination signal representative of suspension characteristic restoration if a difference between a maximum and minimum value of said vehicle height data signal within a second time interval is less than a second reference value thereof for a predetermined number of consecutive times; and
   suspension characteristic restoring means responsive to said suspension characteristic restoring determination means for restoring said suspension characteristic, and wherein said first time interval is greater than said second time interval.

2. The suspension control system according to claim 1, wherein said first reference value is greater than said second reference value.

3. The suspension control system according to claim 1, wherein said suspension characteristic alteration means controls said suspension characteristic to harder state.

4. The suspension control system comprising;
vehicle height detection means for providing a vehicle height signal representative of a vehicle height;
suspension characteristic alteration determination means for providing a vehicle height data signal responsive to said vehicle height signal and for providing a first determination signal representative of a suspension characteristic alteration if a difference between a maximum and and minimum value of said vehicle height data signal within a first time interval exceeds a first value thereof;
suspension characteristic alteration means responsive to said alteration determination means for altering said suspension characteristic;
vehicle height alteration determination means for providing a second determination signal representative of a vehicle height alteration if a difference between a maximum and minimum value of said vehicle height data signal within a second time interval is greater than a second reference value thereof for a predetermined number of consecutive times;
vehicle height alteration means responsive to determination means for altering said vehicle height and wherein said first time interval is greater than said second time interval.

5. The suspension control system according to claim 4, wherein said first reference value is greater than said second reference value.

6. The suspension control system according to claim 4, wherein said suspension characteristic alteration means controls suspension characteristic to harder state.

7. The suspension control system according to claim 4, wherein said vehicle height alteration means controls said vehicle height to a higher position.

8. The suspension control system according to claim 1 or 4, wherein said suspension characteristic alteration determination means includes memory means for storing a conversion table determinative of said vehicle height signal.

9. The suspension control system according to claim 4, wherein said vehicle height alteration determination means includes memory means for storing a second speed responsive table of a vehicle speed and said vehicle height and means for providing said second determination signal in accordance with said table.

10. The suspension control system according to claim 1 or 4, wherein said suspension characteristic alteration determination means includes memory means for storing a responsive table of a vehicle speed and said suspension characteristic and means for providing said first determination signal in accordance with said table.

11. The suspension control system for a vehicle according to claim 1, wherein the vehicle height signal is a function of a displacement of said vehicle height from a standard value thereof.

12. The suspension control system for a vehicle according to claim 1, wherein the vehicle height signal is a function of a speed of the change in the vehicle height signal.

13. The suspension control system for a vehicle according to claim 1, wherein the vehicle height signal is a function of an acceleration of the change in the vehicle height signal.

14. The suspension control system for a vehicle according to claim 1 or 4, wherein said vehicle height signal is a function of an amplitude of the vibration of said vehicle height.

15. The suspension control system for a vehicle according to claim 1 or 4, including suspension characteristic alteration means responsive to said first and second determination signals, wherein said suspension characteristic alteration means alters a suspension characteristic by varying the spring constant of an air suspension.

16. The suspension control system for a vehicle according to claim 1 or 4, including suspension characteristic alteration means responsive to said first determination signals, wherein said suspension characteristic alteration means alters a suspension characteristic by varying damping a force of a shock absorber.

17. The suspension control system for a vehicle according to claim 1 or 4, including suspension characteristic alteration means responsive to said first determination signal, wherein said suspension characteristic alteration means alters a suspension characteristic by varying compliance of a bush of the suspension.

18. The suspension control system for a vehicle according to claim 1 or 4, including suspension characteristic alteration means responsive to said first determination signal, wherein said suspension characteristic alteration means alters a suspension characteristic by varying a torsional stiffness of a stabilizer.

19. The suspension control system according to claim 4, wherein said vehicle height alteration means enlarges a volume of a chamber of an air spring thereof so that the vehicle height can be raised and decreases the volume so that the vehicle height can be lowered.

* * * * *